US012282575B2

(12) United States Patent
Yannuzzi et al.

(10) Patent No.: US 12,282,575 B2
(45) Date of Patent: Apr. 22, 2025

(54) DYNAMIC RESOLUTION AND ENFORCEMENT OF DATA COMPLIANCE

(71) Applicant: Cisco Technology, Inc., San Jose, CA (US)

(72) Inventors: Marcelo Yannuzzi, Vufflens-la-Ville (CH); Hervé Muyal, Gland (CH); Jean Andrei Diaconu, Haute-Savoie (FR); Frank Brockners, Cologne (DE); Carlos Goncalves Pereira, Carlsbad, CA (US)

(73) Assignee: Cisco Technology, Inc., San Jose, CA (US)

( * ) Notice: Subject to any disclaimer, the term of this patent is extended or adjusted under 35 U.S.C. 154(b) by 288 days.

(21) Appl. No.: 17/859,720

(22) Filed: Jul. 7, 2022

(65) Prior Publication Data
US 2024/0012921 A1 Jan. 11, 2024

(51) Int. Cl.
G06F 21/62 (2013.01)
G06F 9/54 (2006.01)
G06F 21/60 (2013.01)
G06F 16/2457 (2019.01)

(52) U.S. Cl.
CPC .......... *G06F 21/6218* (2013.01); *G06F 9/543* (2013.01); *G06F 21/60* (2013.01); *G06F 16/24573* (2019.01); *G06F 21/6245* (2013.01)

(58) Field of Classification Search
None
See application file for complete search history.

(56) References Cited

U.S. PATENT DOCUMENTS

| 8,850,516 B1* | 9/2014 | Hrebicek | G06F 21/6218 707/610 |
| 9,949,129 B1 | 4/2018 | Henry et al. | |
| 10,713,664 B1 | 7/2020 | Alagappan et al. | |
| 10,764,357 B1* | 9/2020 | Bonczkowski | H04L 43/10 |
| 11,513,910 B2* | 11/2022 | Natanzon | G06F 11/1448 |
| 11,539,709 B2* | 12/2022 | Bhaskar S | H04L 63/102 |
| 2005/0021689 A1 | 1/2005 | Marvin et al. | |
| 2007/0107043 A1* | 5/2007 | Newstadt | H04L 63/102 726/2 |
| 2009/0099860 A1 | 4/2009 | Karabulut et al. | |
| 2009/0183240 A1* | 7/2009 | Feather | H04L 63/104 380/255 |
| 2014/0280961 A1 | 9/2014 | Martinez et al. | |

(Continued)

OTHER PUBLICATIONS

"Global Apps, Local Compliance", online: https://incountry.com/, accessed May 24, 2022, 10 pages.

(Continued)

*Primary Examiner* — Lashonda Jacobs-Burton
(74) *Attorney, Agent, or Firm* — BEHMKE INNOVATION GROUP LLC; James M. Behmke; James J. Wong

(57) ABSTRACT

In one embodiment, a device may obtain a location of an endpoint that communicates with an application service. The device may match the location of the endpoint to a data compliance policy. The device may identify sensitive data within the application service to which the data compliance policy applies. The device may configure the application service to permit the endpoint to at least one of access or send the sensitive data when permitted by the data compliance policy.

20 Claims, 11 Drawing Sheets

(56) References Cited

U.S. PATENT DOCUMENTS

| | | | |
|---|---|---|---|
| 2014/0282840 A1* | 9/2014 | Guinan | H04L 63/0823 |
| | | | 726/1 |
| 2015/0281287 A1 | 10/2015 | Gill et al. | |
| 2016/0344736 A1 | 11/2016 | Khait et al. | |
| 2017/0170970 A1 | 6/2017 | Leighton et al. | |
| 2017/0171192 A1* | 6/2017 | Guinan | H04L 63/0823 |
| 2017/0201569 A1 | 7/2017 | Fu et al. | |
| 2017/0300309 A1 | 10/2017 | Berger et al. | |
| 2018/0027022 A1 | 1/2018 | Nagaratnam et al. | |
| 2018/0096158 A1* | 4/2018 | Murphy | G06F 21/6218 |
| 2018/0124066 A1* | 5/2018 | Minkovich | H04L 9/3297 |
| 2018/0124113 A1* | 5/2018 | Lock | H04L 63/20 |
| 2018/0212952 A1* | 7/2018 | Guinan | H04L 63/0823 |
| 2018/0260566 A1 | 9/2018 | Chaganti et al. | |
| 2018/0276393 A1* | 9/2018 | Allen | G06F 40/205 |
| 2018/0352003 A1* | 12/2018 | Winn | H04L 63/10 |
| 2019/0014123 A1 | 1/2019 | Akireddy et al. | |
| 2019/0228171 A1 | 7/2019 | Mathur | |
| 2019/0332793 A1* | 10/2019 | Guinan | H04L 67/141 |
| 2020/0293675 A1* | 9/2020 | Antonatos | G06F 21/6218 |
| 2020/0364351 A1 | 11/2020 | Sanchez et al. | |
| 2021/0006972 A1 | 1/2021 | Guim Bernat et al. | |
| 2021/0152561 A1 | 5/2021 | Shelton et al. | |
| 2021/0286638 A1 | 9/2021 | Fan et al. | |
| 2021/0329001 A1* | 10/2021 | Barton | H04L 63/20 |
| 2021/0360037 A1 | 11/2021 | Beckman et al. | |
| 2022/0321362 A1* | 10/2022 | Konda | G06F 21/57 |
| 2022/0345491 A1* | 10/2022 | Luo | H04L 63/20 |
| 2023/0401332 A1* | 12/2023 | Vahidnia | G06F 21/31 |
| 2024/0039959 A1* | 2/2024 | Yannuzzi | H04L 63/20 |
| 2024/0176677 A1* | 5/2024 | Youssef | G06F 9/5094 |

OTHER PUBLICATIONS

"Global Cloud Service Provider", online: https://us.ovhcloud.com/, accessed May 24, 2022, 11 pages.

"Google Distributed Cloud", online: https://cloud.google.com/distributed-cloud, accessed May 24, 2022, 8 pages.

Kurian, Thomas, "How Google Cloud is addressing the need for data sovereignty in Europe in 2020", online: https://cloud.google.com/blog/products/identity-security/how-google-cloud-is-addressing-data-sovereignty-in-europe-2020, accessed May 24, 2022, 2 pages.

"Gaia-X: A Federated Secure Data Infrastructure", online: https://www.gaia-x.eu/, accessed May 24, 2022, 6 pages.

"RegTech 100", online: https://fintech.global/regtech100/, accessed May 24, 2022, 14 pages.

"OneTrust Cloud Solutions", online: https://www.onetrust.com/, accessed May 24, 2022, 5 pages.

"Collibra—The Data Intelligence Cloud", online: https://www.collibra.com/us/en, accessed May 24, 2022, 4 pages.

"LogicGate Risk Cloud", online: https://www.logicgate.com/, accessed May 24, 2022, 5 pages.

"Governance and Security for Low-Code/No-Code Applications", online: https://www.zenity.io//, accessed May 24, 2022, 6 pages.

Zacks, et al., "Network Data Objectivization, Classification, Verification and Privacy via Ring-Oriented Metadata", Defensive Publication Series, Jul. 2021, 11 pages, Technical Disclosure Commons.

* cited by examiner

DYNAMIC RESOLUTION AND ENFORCEMENT OF DATA COMPLIANCE

TECHNICAL FIELD

The present disclosure relates generally to dynamic resolution and enforcement of data compliance.

BACKGROUND

Applications operate by handling data. For instance, executing an application can involve the storage, communication, processing, etc. of various types of data. The various types of data may include data whose handling is subject to various regulations. For example, data handling regulations at national, federal, state, industry, and/or organizational levels may be applicable to the data handled by an application.

The enforcement of data compliance has only been made more complex and potential violations made more likely as applications are increasingly being developed as a set of distributed services running across a mix of multi-cloud and edge infrastructures, handling a mix of data types differentially subject to various regulations, and/or being utilized by mobile endpoints. Unfortunately, following deployment of an application, enforcement of data compliance requirements largely occurs non-specifically and in a programmatic blind-spot. Given the current regulatory environment and trends, continuing to treat data compliance as an afterthought in this manner will likely yield increased violations of data compliance regulations which may result in substantial fines, penalties, and/or other negative impacts to data handlers.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
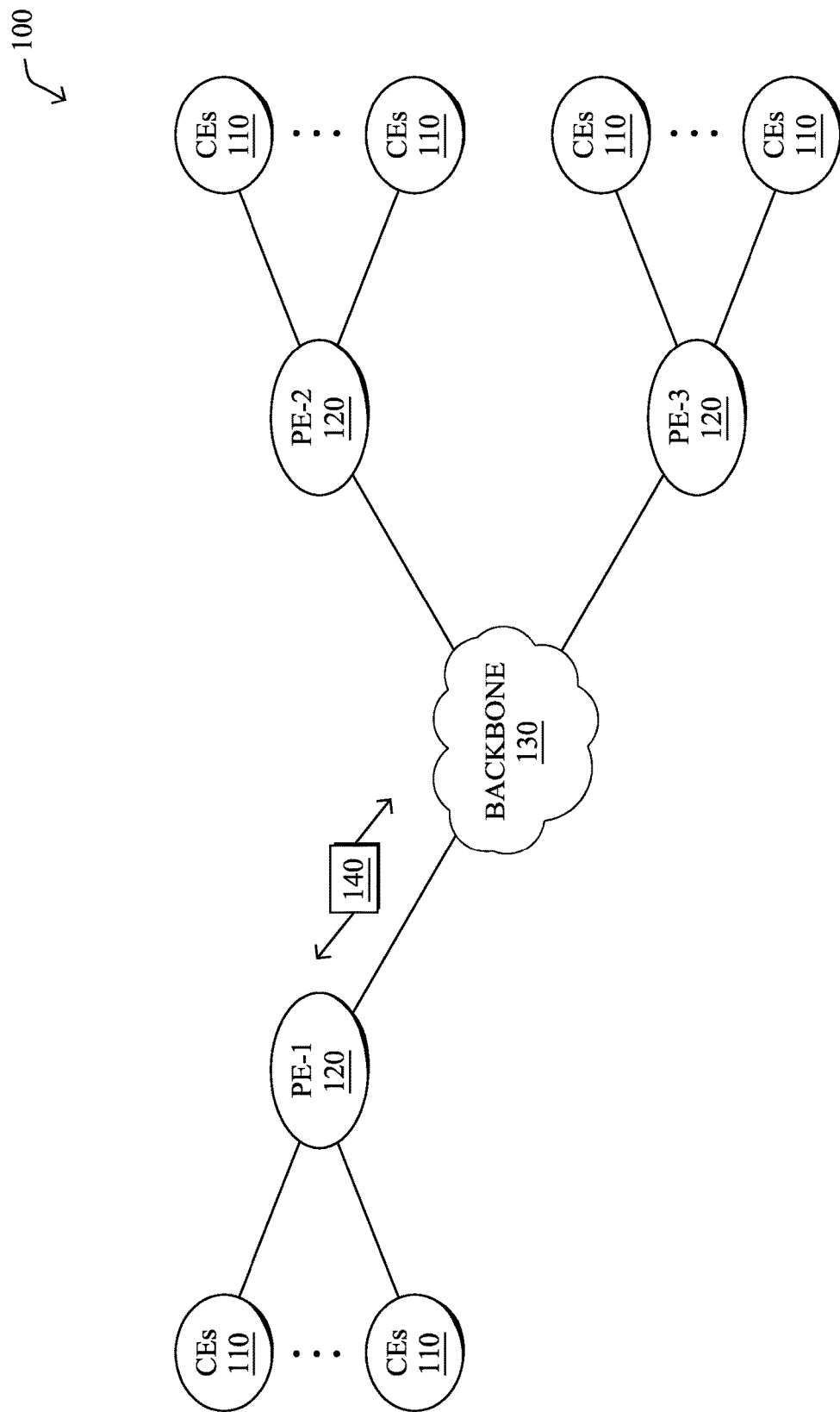
FIGS. 1A-1B illustrate an example communication network.

According to one or more embodiments of the disclosure a device may obtain a location of an endpoint that communicates with an application service. The device may match the location of the endpoint to a data compliance policy. The device may identify sensitive data within the application service to which the data compliance policy applies. The device may configure the application service to permit the endpoint to at least one of access or send the sensitive data when permitted by the data compliance policy.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.
2.) Site Type B: a site connected to the network by the CE router via two primary links (e.g., from different Service Providers), with potentially a backup link (e.g., a 3G/4G/5G/LTE connection). A site of type B may itself be of different types:
2a.) Site Type B 1: a site connected to the network using two MPLS VPN links (e.g., from different Service Providers), with potentially a backup link (e.g., a 3G/4G/5G/LTE connection).
2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.
2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B 1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
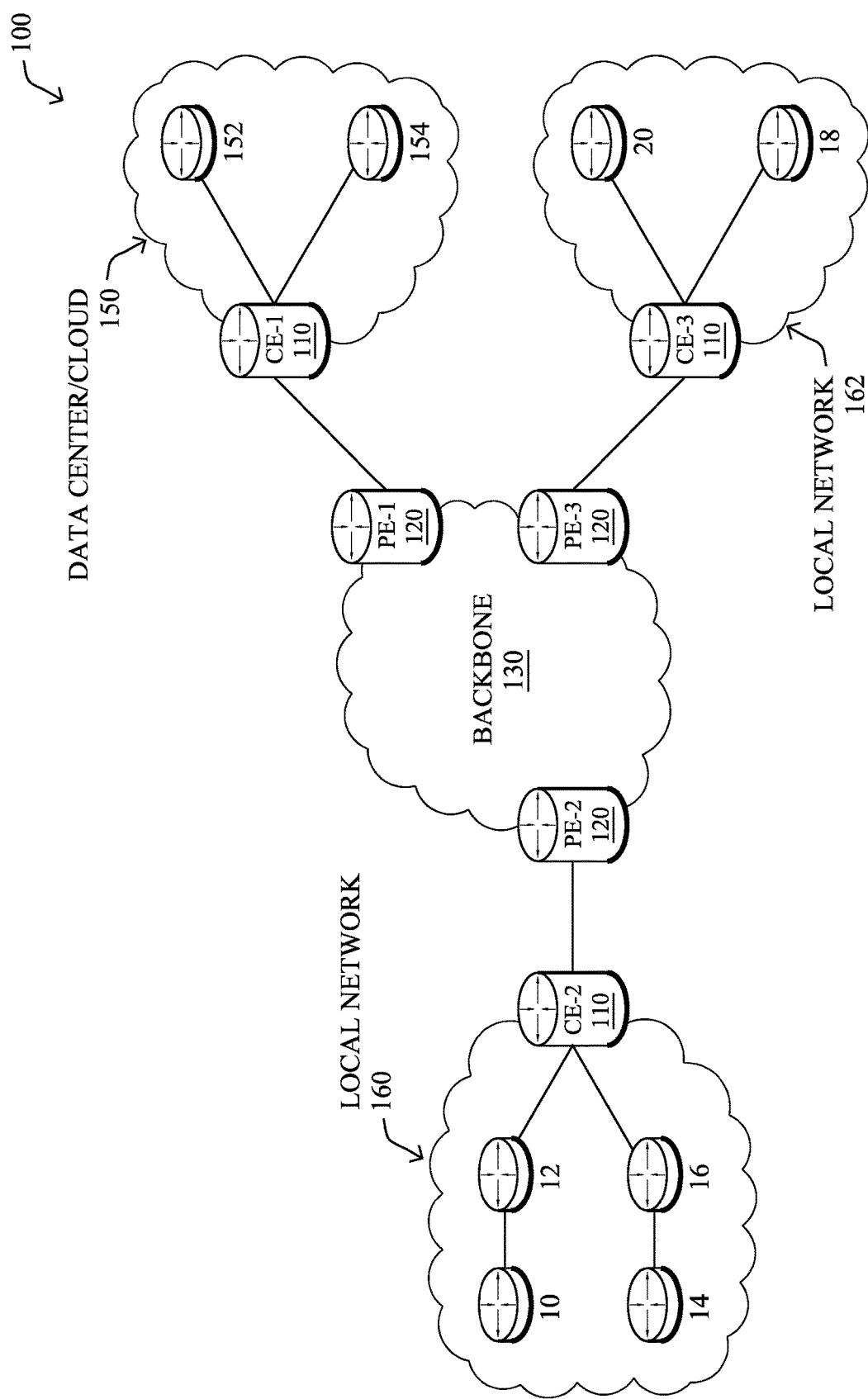

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
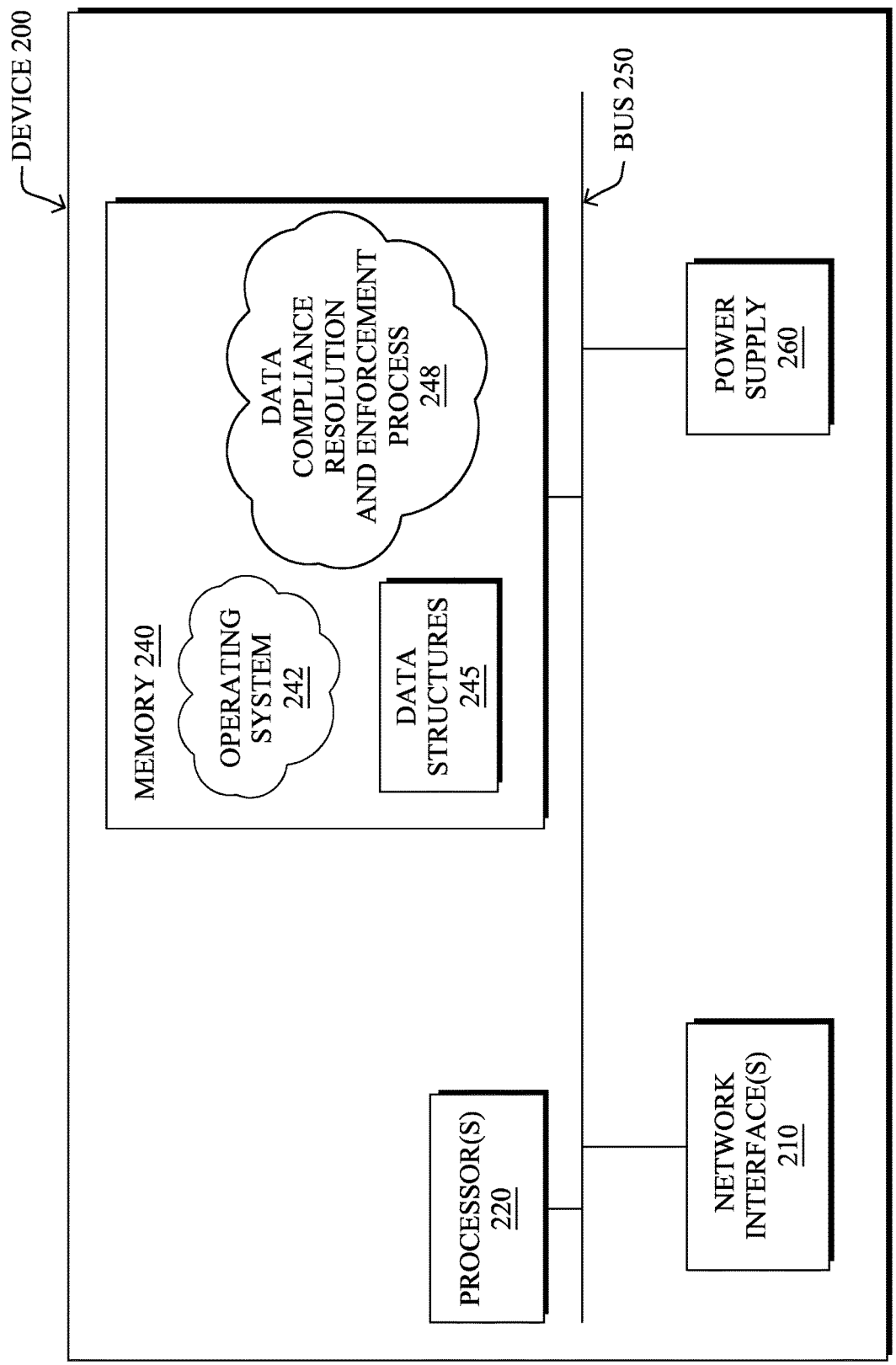
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise data compliance resolution and enforcement process 248, as described herein, any of which may alternatively be located within individual network interfaces.

Figure 3:
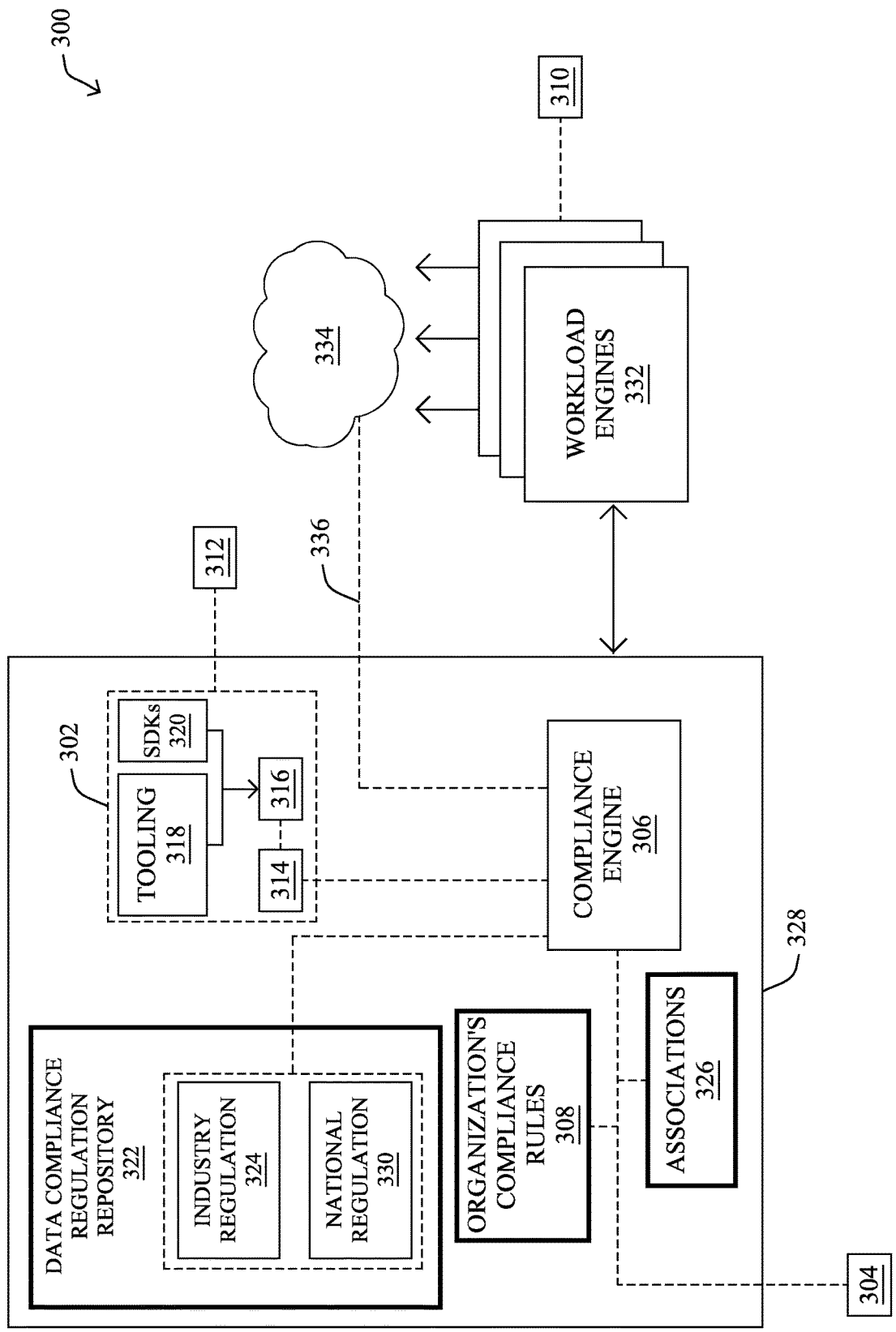
FIG. 3 illustrates an example architecture for data compliance.

FIG. 3 illustrates an example architecture 300 for data compliance, according to various embodiments. The architecture 300 may include a data compliance process 328. Data compliance process 328 may be utilized to provide configuration, observability, and enforcement of data compliance rules. Data compliance process 328 may accomplish these functions utilizing Data Compliance as Code (DCaC).

DCaC may include integrating a data compliance mechanism into the program code of the application. For example, data compliance process 328 may be utilized to build data compliance into the application development process, supported by automated code annotations, bindings between such annotations and categories of sensitive data, and controls at code, build, and pre-deploy time. Data compliance process 328 may provide a mechanism whereby application developers proactively assist data teams, application managers, and legal departments with data compliance, while ensuring that developers may remain oblivious to specific regulations, data related obligations, or compliance requirements that organizations might have across different regions.

For example, data compliance process 328 may include data annotating process 302. Data annotating process 302 may facilitate application developer 312 automatically adding metadata to program code of an application 316 during the development of the application 316. In various embodiments, this may be performed by automated annotations of data fields in the program code and by the creation of references to such annotations at code-build time. These references to annotated code may be automatically rendered in the form of machine-readable data manifest 314.

More specifically, data annotating process 302 may provide a mechanism for automated annotations of the program code of application 316, including classes, application programming interfaces (APIs), and the resulting data at code/build time (e.g., by implementing a Low-Code/No-Code approach supported by software development kits (SDKs) 320 and tooling 318). Application developers may utilize SDKs 320 and tooling 318 to automatically label data topics, data producers, data consumers, data processors, data holders, etc. For instance, developers may label certain data by annotating it with a data type identifier. For example, a developer may annotate certain data as "protected-type-1," or other data as "protected-type-2," and so on.

SDKs 320 in data annotating process 302 may provide a set of predefined data types out-of-the-box, including associations by default to specific categories of sensitive data. Sensitive data may include a type of data that may be considered personal, private, sensitive, confidential, protected, secret, restricted, personally identifiable information (PII), etc. In some examples, sensitive data may include data that is subject to regulation. For example, Table 1 lists examples of predefined protected data types and default associations to some examples of categories of sensitive data.

TABLE 1

| PROTECTED DATA TYPE | DEFAULT ASSOCIATION |
| --- | --- |
| protected-type-1 | Customer PII |
| protected-type-2 | Employee PII |
| ... | ... |
| protected-type-23 | Patient Analysis Results |
| protected-type-41 | Sales Confidential |
| ... | ... |
| protected-type-56 | Restricted HR |
| ... | ... |
| unprotected | NA |

A list of the associations, such as the example illustrated in Table 1, may provide associations by default to several categories of sensitive data, including but not limited to PII, confidential, restricted, and unprotected data. In some embodiments, the set of predefined protected data types might be standardized or rely on an existing taxonomy.

SDKs 320 in data annotating process 302 may also provide a mechanism to define and use custom data types in annotating program data of the application 316. For example, custom data types may be utilized, which identify protected data types that are not covered by any of those available by default in SDKs 320. For example, "custom-type-1" might be a custom data type associated to a category of sensitive data such as "Restricted Employee Poll." In various embodiments, the generation and/or insertion of the annotations into the program code of the application 316 may be accomplished by an automated process (e.g., a programmatic identification of data of a particular data type triggering an automated insertion of an annotation of the data as the particular data type, etc.), a partially automated process (e.g., a programmatic flagging of data of a particular data type with a supervised or manual annotation of the data as the particular data type, etc.), and/or a manual process (e.g., a manual flagging of data of a particular data type and/or a manual annotation of the data as the particular data type, etc.).

In various embodiments, associations between protected data types and categories of sensitive data may be assigned and/or instrumented by different organizations and at different moments in time. In some cases, the association between protected data types and categories of sensitive data may be assigned by application developers 312 at code/build time. This might be the case when the team of application developers 312 is part of, or develops for, the organization that may use or manage the application 316. In such cases, the team of application developers 312 might have sufficient knowledge about the data and their use, so that they may either use the associations provided by default or create custom ones.

In additional instances, application developers 312 of application 316 and/or the users of the application 316 might belong to different organizations. For example, this may be the case when application developers 312 are a DevSecOps team that develops an application 316 that may be used across different organizations, industries, etc. In such cases, application developers 312 may be unaware of the categories of data that should be assigned by a data team and/or application manager 304 in another organization (e.g., precisely what data is confidential and what data is not with respect to that organization and its use of the application 316). In these instances, application developers 312 may leverage SDKs 320 and tooling 318 to approach data labeling and association in a manner that sidesteps the knowledge deficit while still instilling the functionality. For example, the application developers 312 may leverage SDKs 320 and tooling 318 to automatically add the different classes of protected data type at code and build time (e.g., utilizing predefined and custom protected data types). Additionally, or alternatively, the application developers 312 may leverage SDKs 320 and tooling 318 to automatically insert references in the form of machine-readable descriptions for the protected data types that may be used to generate data manifest 314 bound to application 316 at build time.

The protected data type annotations and their corresponding references may be utilized by a data team and/or application manager 304 in another organization to select and/or create automated associations 326 between categories of annotated data in the application 316 (e.g., metadata provided by application developers 312) and specific categories of sensitive data (e.g., personal data, private data, sensitive data, confidential data, protected data, secret data, restricted data, PII, etc.). For instance, each protected data type might be bonded to a class of tokens (e.g., JSON Web Tokens with a specific scope), which in turn might represent different categories of sensitive data for a data team and/or application manager 304.

In a specific example, an API call for application 316 may be labeled by application developers 312 with a data type identifier such as "custom-type-7" at code/build time. The "custom-type-7" labeled API call may attempt to access certain data using its bound token (e.g., "Token 7") with a scope defined by, for example, a data team and/or application manager 304 before application 316 was deployed. From the data team and/or application manager 304 perspective, the attempt to access this data may translate to a request to access, for instance, "Confidential Partner" data. As such, the data type labels, and their associations may be utilized as an automated data mapping between the programmatic operations of application 316 and the sensitive data implicated in those operations. In various embodiments, these associations and functionalities may be supported by compliance engine 306 based on the selection, configuration, and automation of data compliance rules before application 316 is deployed and/or post-deployment.

In some examples, application developers 312, which again may be a DevSecOps team, might opt for a hybrid approach to generating these associations. For example, this may be the case when making some custom associations between data types and categories of sensitive data or using those predefined in the system (e.g., "protected-type-1" to "Customer PII") might not only be trivial for the application developers 312 but also may facilitate the task of a data team and/or application manager 304 in defining associations. However, other the associations might not be apparent to application developers 312. Hence, certain data in application 316 may be labeled as "protected types" along with their corresponding machine-readable descriptions in data manifest 314, though they may remain unassigned to a specific category of sensitive data, so they can be associated later by a data team and/or application manager 304 before the application is deployed, or by an automated data lineage, classification, and tagging process at run time (e.g., during the testing phase, that is, before the application is deployed in production).

In some embodiments, a data team and/or application manager 304 may be provided with a mechanism to change the associations created by application developers 312 or even associate more than one category of sensitive data to a given data type (e.g., a data team and/or application manager 304 may associate certain data with both "Employee PII" and "Confidential Data"). Hence, two categories of data compliance policies (e.g., one for "Employee PII" and another for "Confidential Data") may apply and restrict even further the access to this category of data. In general, a data team and/or application manager 304 may be able to Create, Read, Update, or Delete (CRUD) any association between the metadata provided by application developers 312 and categories of sensitive data.

In various embodiments, a data team and/or application manager 304 may proactively create a set of custom data types. A data team and/or application manager 304 may provide the set of custom data types to application developers 312. Application developers 312 may then utilize the set of custom data types so that application 316 is annotated at development based on guidelines (e.g., the set of custom data types, etc.) provided beforehand by the data team and/or application manager 304.

In additional embodiments, application developers 312 and a data team and/or application manager 304 may collaborate to annotate application 316. For example, application developers 312 and a data team and/or application manager 304 may iterate in the annotation and association processing in an agile manner. For example, the iteration may be performed as part of a continuous integration/continuous delivery (CI/CD) pipeline (e.g., at testing, staging, and production).

In some examples, application 316 may be composed of several services developed with different programming languages. Therefore, application 316 may utilize different SDKs 320. In some instances, the annotation methods and terminology applied to application 316 may vary depending on the programming language (e.g., usually referred to as attributes in C#, decorators in Python, annotations in Golang, etc.). In such cases, tooling 318 of data annotating process 302 may examine the different predefined and custom data types used with different SDKs 320, perform checks, and ensure consistency in the annotations and enumeration across the different services at build time. For example, these consistency checks may ensure that a given "custom-type-X" data type identifier represents the same type of data across services programmed using different programming languages even if they were programmed by different developers. Overall, the data annotating process 302 may provide different degrees of freedom to application developers 312, data teams and/or application managers 304, and the number of protected data types used, and their corresponding associations may vary depending on the type of application 316.

Data annotating process 302 may, as described above, be utilized in generating automated data references. Specifically, data annotating process 302 may automatically render a data manifest 314 bonded to application 316 at build time. Data manifest 314 may provide machine-readable descriptions of the predefined and/or custom data types used by application 316. A combination of SDKs 320 and tooling 318 may facilitate the instrumentation and automation of the program code at build time, including the automated rendering of data manifest 314. In some cases, application 316 may be composed of various containers. Each container may be built and packaged with its own data manifest, such that the final data manifest rendered for application 316 may be a composition of the individual data manifests. In some cases, application 316 may include dependencies on external services, such as a MySQL database. Such dependencies may be captured as a dependency manifest. Data fed, processed, retained, or retrieved from these external services may also be annotated and automatically captured in application 316 data manifest 314.

Data annotating process 302 may, as described above, be utilized for decoupling data compliance from the business logic of application 316. For example, SDKs 320 and tooling 318 of data annotating process 302 may provide automated mechanisms for decoupling the configuration, observability, and enforcement of data compliance rules from the business logic of application 316. In some instances, application 316 may be a cloud/edge native application, which may be implemented as a set of workloads composing a service mesh. The decoupling of data compliance from the business logic may be especially relevant for applications of this type, as geographically dispersed and/or variably deployed workloads may implicate increased data compliance complexity.

Various possible embodiments for decoupling data compliance from the business logic of application 316 may be utilized. For instance, a sidecar model, where the services that implement the business logic of application 316 are deployed together with sidecar proxies associated to each of those services, may be utilized. The sidecar proxies may be utilized to enforce horizontal functions that are independent of the business logic, such as routing, security, load balancing, telemetry, retries, etc. As such, the sidecars may be well-positioned to decouple, observe, and control data compliance. For example, a combination of distributed data compliance controllers and sidecar proxies may be used to configure, observe, and enforce data compliance rules across different geographies, and distributed multi-cloud and edge infrastructures 334.

Instead of, or in addition to, using sidecars, various embodiments may use client libraries, daemons working in tandem with the application-specific services, or sandboxed programs in the OS kernel, e.g., using the Extended Berkeley Packet Filter (eBPF). Further embodiments may use an agentless approach or embed such functionality in Kubernetes itself. In any case, the functionality introduced herein may enable the portability and reuse of observability and enforcement of data compliance functions across not only different applications but also cloud and edge environments.

The above-described data annotating process 302 may yield a portable annotated application 316 that is geared with built-in annotations for different types of protected data. In addition, the yielded annotated application 316 may be structured to operate while remaining agnostic of any state, country, industry, organization-specific regulation and/or data policy requirements that a data team and/or application manager 304 might have. As a result, data annotating process 302 may be leveraged as a new model of building applications including DCaC by not only data teams and/or application managers 304, but also software as a service (SaaS) providers and others.

Data compliance process 328 may provide configuration, observability, and enforcement of data compliance rules. As described above, associations 326 between categories of annotated data in application 316 and specific categories of sensitive data may be instrumented prior to a deployment of application 316. The associations 326 may be used to control the processing and use of data during and after the deployment of application 316. More specifically, compliance engine 306 may utilize associations 326 together with current data compliance regulations governing data handling in each region where application 316 may be used, as well as a specific organization's compliance rules 308 for/while using application 316, to enforce compliance with them. Such controls may apply to data access requests, data storage and retention policies, data processing requirements, etc. of application 316 both at deploy and execution time, etc.

To this end, data compliance process 328 may include data compliance regulation repository 322. Data compliance regulation repository 322 may provide a repository of data compliance rules. For example, data compliance regulation repository 322 may include a repository of industry regulations 324 which may be applicable to the use of application 316. For example, with respect to instances where application 316 is used by a healthcare provider, data compliance regulation repository 322 may include industry regulations 324 such as Health Insurance Portability and Accountability Act of 1996 (HIPAA) regulations applicable to handling of data in the healthcare industry. In other examples, data compliance regulation repository 322 may include a repository of national regulations 330 which may be applicable to the use of application 316. For example, with respect to instances where application 316 is based in a member state of the E.U., data compliance regulation repository 322 may include national regulations 330 such as the GDPR applicable to handling of data in the E.U.

The data compliance regulations included in data compliance regulation repository 322 may be consumed by a data team and/or application manager 304 as a service (aaS). Data compliance regulation repository 322 may support input, expression, collection, approval, visualization, and/or use of data compliance policies covering multiple categories of rules. For example, data compliance regulation repository 322 may store data compliance policies that are specific to an industry, those that may apply at a national, multi-national, federal, state, and industry levels, etc. For instance, an organization (e.g., a multi-national company) may leverage a data compliance regulation repository 322 service of a data compliance process 328 and utilize the regulations already available in data compliance regulation repository 322, which may cover regulations across several industries and countries out-of-the-box. An organization may select the target state, country or region, the industry if needed, and select the data compliance regulations that may be applicable at the organizational level (e.g., organization's compliance rules 308).

Compliance engine 306 may offer APIs and a user-friendly user interface (UI) through which a data team and/or application manager 304 may select and define data compliance requirements. For instance, if application 316, which handles Customer PII data, needs to be deployed in British Columbia, Canada, a data team and/or application manager 304 may simply select "Customer PII→ Apply Local Regulation" to constrain the processing, storage, retention, and access to Customer PII data according to the regulations in British Columbia as retrieved from data compliance regulation repository 322. To this end, compliance engine 306 may compute and handle the resulting constraints that apply to Customer PII data in British Columbia transparently to data teams and/or application managers 304. More specifically, the set of data compliance constraints may be captured in a machine-readable format from data compliance regulation repository 322, and therefore, used by compliance engine 306 programmatically.

In some examples, compliance engine 306 may be utilized as a pluggable module working in tandem with one or more workload engines 332, such as Cisco Intersight or any automation tool offered by a hyperscaler, or other cloud and edge providers. Workload engines 332 may manage the deployment of application 316, subject to the rules and constraints provided by compliance engine 306.

In various embodiments, compliance engine 306 may operate either in a push or a pull model. For instance, in a pull model, a workload engine 332 may receive a request to deploy application 316 in a given region (e.g., a request from a site reliability engineering (SRE) and/or information technology (IT) team 310). In such a case, workload engine 332 may issue a request to compliance engine 306, to compute and return data compliance rules and constraints that must be applied for their specific deployment. Alternatively, in a push model, a data team and/or application manager 304 may select the compliance rules required and a declarative intent for application deployment may be issued from compliance engine 306 to one or more workload engines 332. Such deployments may involve multi-cluster service meshes, which may run across multi-cloud and edge infrastructures 334. In various embodiments, the above-described sidecar proxies in the service mesh may not only provide monitoring and observability of data compliance to compliance engine 306 but also may receive configuration and compliance updates in real-time 336. In additional embodiments, the same functionality may be implemented utilizing client libraries, daemons, eBPF, an agentless approach, or Kubernetes itself. In addition, some embodiments may support the techniques described herein without utilizing a service mesh.

Figure 4A:
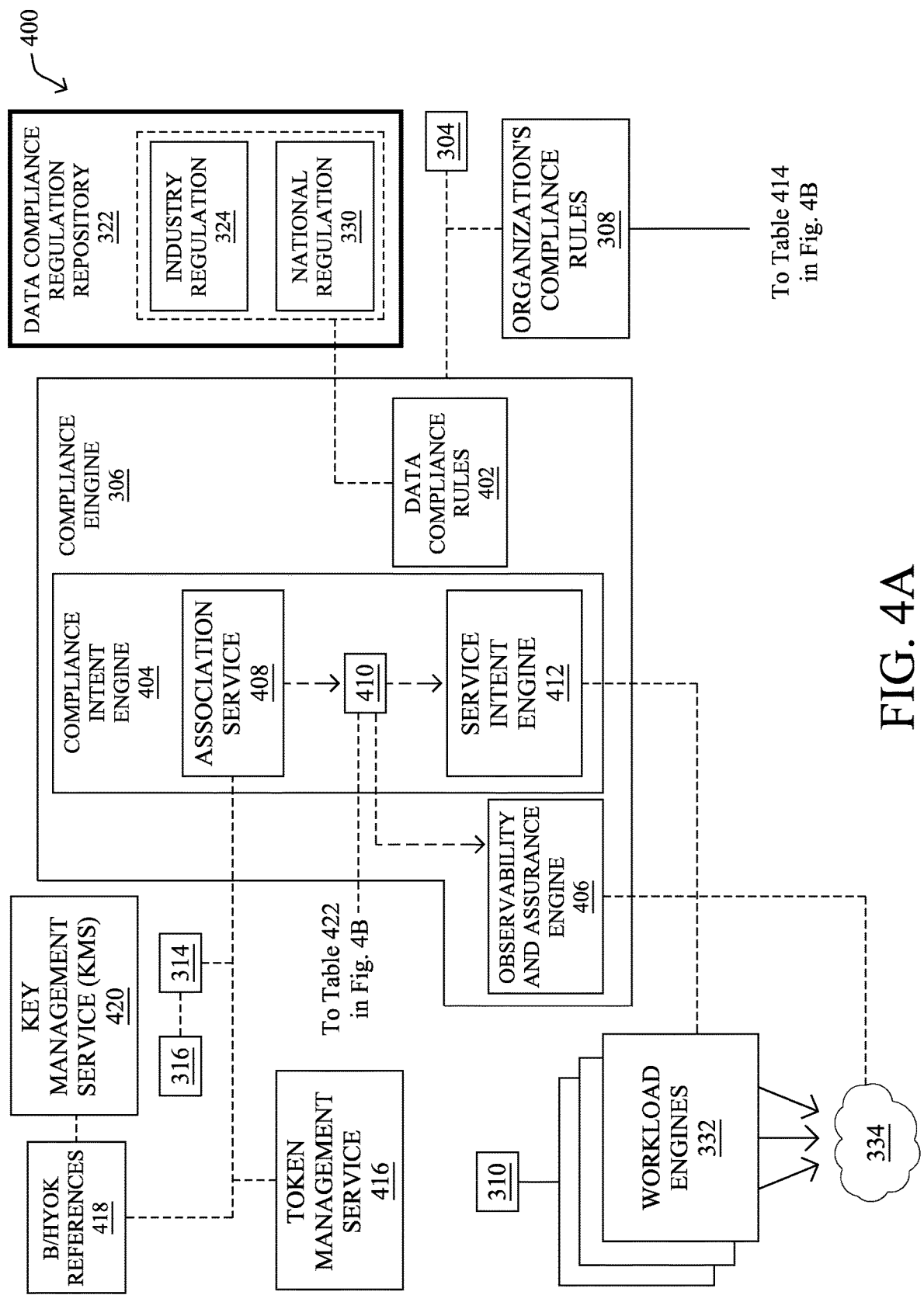
FIGS. 4A-4B illustrate an example architecture for data compliance and protection bindings.
Figure 4B:
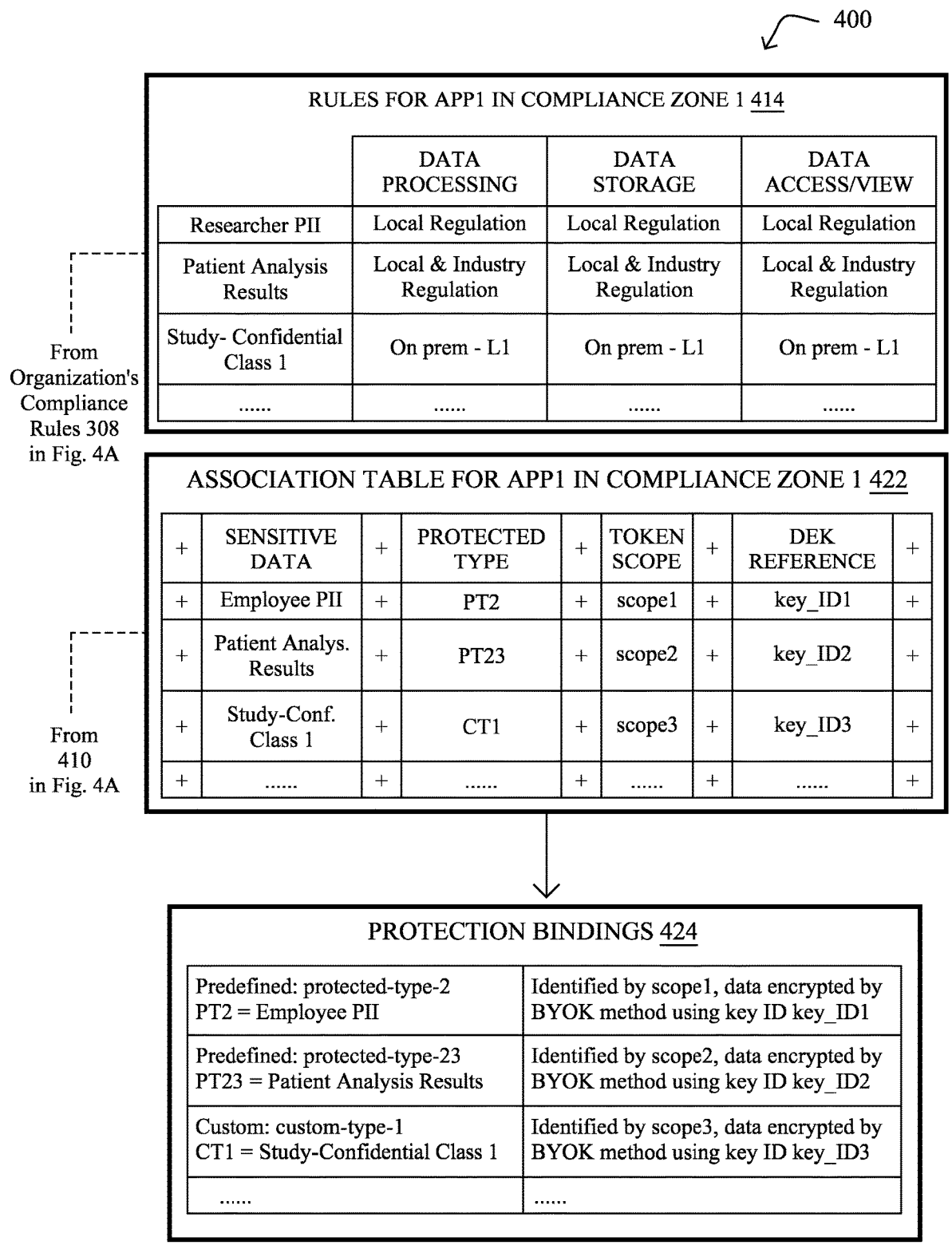

FIGS. 4A-4B illustrate an example architecture 400 for data compliance and protection bindings according to various embodiments. Architecture 400 may be utilized to deliver DCaC. For example, architecture 400 may include compliance engine 306. Compliance engine 306 may include data compliance rules module 402, compliance intent engine 404, and/or observability and assurance engine 406.

Data compliance rules module 402 may compute compliance constraints based on a combination of inputs. For example, the constraints may be computed based on a combination of inputs including the target state, country, or multi-country region for an application, the industry the application is being utilized within, and/or the compliance rules required by an organization using the application.

Compliance intent engine 404 may include an association service 408. Association service 408 may manage a set of association tables 410. Association service 408 may include functionality to allow a data team and/or application manager 304 to select, configure, and create the associations (e.g., associations 326 from FIG. 3) and store them in the form of protection bindings 424 in association tables 410 (e.g., populated association table 422 and its associated protection bindings 424 provide a non-limiting specific example of one such association table). The protection bindings 424 may define a data handling scope bonded to the association between a data type and its associated category of sensitive data. The data handling scope may be an indication of how data will be handled by the application (e.g., applicable tokens, token scopes, encryption keys, etc.). The protection bindings 424, stored in populated association table 422 may be created and/or maintained by compliance engine 306. The protection bindings 424 may not be reinserted into the program code but rather maintained by compliance engine 306 since protection bindings 424 may be subject to changes over time (e.g., the scopes might change, encryption keys may be rotated, etc.) and keeping the protection bindings 424 outside of the program code may prevent these changes from affecting the program code.

Additionally, compliance intent engine 404 may include a service intent engine 412. Service intent engine 412 may interface with workload engines 332. Service intent engine 412 may either receive and/or process data compliance requests from workload engines 332 (e.g., pull model) or create and/or issue declarative intents encoding a deployment request to workload engines 332 (e.g., push model).

Observability and assurance engine 406 may receive telemetry data from services deployed in the field (e.g., from a service mesh deployed across multi-cloud and edge infrastructures 334). In addition, observability and assurance engine 406 may push data compliance configurations and data traffic filters in real-time 336 out to workloads deployed in the multi-cloud and edge infrastructures 334.

To populate association tables 410 and create protection bindings 424, association service 408 may obtain inputs defining the associations of the protected data types and/or their data handling scopes. For example, for each annotated application 316, association service 408 may obtain data manifests 314 describing the set of predefined and custom protected data types handled by annotated applications 316 and potential associations already made by application developers (e.g., application developer 312 in FIG. 3).

Additionally, association service 408 may obtain data handling scopes to be bonded to individual associations between given data types and their associated category of sensitive data. For example, association service 408 may obtain, as an input, categories of tokens and corresponding scopes that may be associated with each of the protected data types used in the annotated classes and methods that compose the annotated application 316. Such tokens may be defined and/or obtained from external token management service 416 (e.g., from OKTA).

Further, association service 408 may obtain, as an input, identifiers of encryption keys. The encryption keys may be those keys associated with each of the protected data types used in the annotated classes and methods that compose annotated applications 316. For example, different categories of sensitive data may be encrypted utilizing techniques such as bring your own key (BYOK) or hold your own key (HYOK). The encryption key identifiers (ID) may be defined or obtained from external encryption key service 418, which may extract encryption key IDs. External encryption key service 418 may interface with key management service (KMS) 420 and may create references (e.g., key IDs) to encryption keys stored and managed by KMS 420. In this manner, the keys may not be managed by association service 408, but instead may remain secure with KMS 420.

This set of inputs may be utilized by association service 408 to populate association tables 410. In some examples, there may be one association table populated per annotated application 316 and/or per data compliance zone (e.g., a geographical area where the application is deployed, etc.). A populated association table 422 may include the automatically associated annotated data types (e.g., protected data type labels), with categories of sensitive data (e.g., encoded in the form of tokens with specific scopes as illustrated in populated association table 422), along with pointers to the encryption keys used for each category of protected data (e.g., key IDs).

Compliance engine 306 may handle one populated association table 422 per compliance zone for each annotated application 316. In some embodiments, populated association table 422 may be extended to include columns denoting API paths to access the data resources. In some cases, the paths may explicitly embed the protected data types used by the application developers. In addition, the tokens, scopes, and key IDs may be renewed and dynamically updated in populated association table 422 depending on their validity and/or expiration time. Populated association table 422 may also manage more advanced associations, including m:n bindings (e.g., two or more protected data types might be associated to a single token/scope class).

Once association tables 410 are defined and/or populated, a data team and/or application manager 304 may select the organization's compliance rules 308. Organization's compliance rules 308 may include data compliance rules (e.g., data compliance rules 414) selected to be required for a specific annotated application 316 (e.g., "App 1") that should be deployed in a specific geographical region (e.g., "Compliance Zone 1").

For example, data compliance rules 414 may include constraints selected to be applied to each category of sensitive data (e.g., "Researcher PII," "Patient Analysis Results," "Study-Confidential Class 1," etc.) within annotated application 316 "App 1". Data compliance rules 414 may further specify the selected constraints associated with processing the category of sensitive data, storage, and retention of the category of sensitive data, and/or accessing or viewing of the category of sensitive data by the annotated application 316.

Data compliance rules 414 may be rules that may apply to a new annotated application 316 (e.g., "App 1"). In this example, application "App 1" may handle data about clinical trials of a new drug developed by a pharmaceutical company. Application "App 1" may collect and analyze data and provide insights about the new drug. In this example, the application "App 1" may support several categories of sensitive data.

For example, the application "App 1" may support the category of sensitive data "Researcher PII" data, which may include PII of the employee conducting one of the trials. In this example, the rule chosen may be one to restrict the processing, storage, retention, and access to the data according to a "local regulation." For example, if the compliance zone where the application is going to be deployed is British Columbia, Canada, then this rule automatically constrains the location of workloads, the storage, and any attempt to access or view such data according to the regulation on PII in British Columbia, Canada. If the trials were instead to be conducted in New Delhi, India, the rule might be the same (e.g., applying a local regulation), but the resulting constraints yielded by compliance engine 306 will usually differ from those in British Columbia, Canada by virtue of the two locations having different data handling regulations.

Application "App 1" may also support the category of sensitive data "Patient Analysis Results" data. In this example, the rule chosen by a data team and/or application manager 304 may adhere to both the local and industry-specific regulation. In the examples of application "App 1," the industry-specific regulation may include, for example, specific legislation constraining the processing, storage, retention, and access to patients' data with respect to clinical trials.

Application "App 1" may additionally support the category of sensitive data "Study-Confidential Class 1" data. This data type may be a custom protected data type that may be implemented to enable researchers to keep a specific category of data related to the clinical trials as highly confidential. In this example, the processing, retention, and access to the data may be constrained to a specific facility. For example, perhaps the processing, storage, retention, and access of the "Study-Confidential Class 1" data is constrained to the premises of a "Laboratory 1" associated with the clinical trial (e.g., "On prem-L1").

Based on data compliance rules 414 input along with the corresponding protection bindings 424, data compliance rules module 402 may identify the implicated categories of sensitive data. For example, the three categories of sensitive data (e.g., "Employee PII," "Patient Analysis Results," and "Study-Confidential Class 1") listed in data compliance rules 414, along with corresponding protection bindings 424 in populated association table 422 may be identified by data compliance rules module 402. These categories of sensitive data may be defined and/or used by a data team and/or application manager 304 and/or may have already been associated to specific predefined and custom protected data types, such as the ones shown in populated association table 422 and/or protection binding 424.

In addition, data compliance rules module 402 may identify the selected compliance requirements listed in data compliance rules 414. For example, data compliance rules module 402 may identify the compliance requirements specified for processing, storage, retention, and access for each of the categories of sensitive data as defined in data compliance rules 414.

Data compliance rules module 402 may compute the set of compliance constraints that apply to application "App 1" based on data compliance rules 414 and/or a compliance zone selected (e.g., a target country and industry for "App 1"). In some examples, the set of compliance constraints may be computed from, for example, industry regulations 324, national regulations 330, etc. obtained from data compliance regulation repository 322.

The output of data compliance rules module 402 (e.g., the computed set of compliance constraints for a category of sensitive data) may be processed by compliance intent engine 404. Compliance intent engine 404 may link the resulting constraints to the corresponding populated association table 422 and send this output to both observability and assurance engine 406 and service intent engine 412. As such, the compliance constraints may be linked to categories of sensitive data and/or their associated protected data types in the program code. Therefore, the compliance constraints may be linked to individual portions of the application code. For instance, the constraints may be linked to control a data transfer through an API call that was previously annotated by application developers 312 using the protected data types referenced in protection bindings 424, populated in association table 422, and constrained by data compliance rule module 402 according to data compliance rules 414.

In various embodiments, once a service mesh is deployed, a data consumer process may request access to a data resource through an API. This may be implemented using a GET method including a path containing the field "custom-type-1" (CT1), which, according to populated association table 422, represents the custom protected type "Study-Confidential Class 1." The HTTP request may be transported and forwarded over mTLS across the sidecar proxies in the service mesh. The authorization header in the service mesh may carry "token 3" with a specific scope "scope 3," as defined in populated association table 422. In this example, "scope 3" represents the category of sensitive data "Study-Confidential Class 1," and the constraint in this case is that the data of that type must be retained on "prem Lab1." To that end, service intent engine 412 may have requested and/or instructed a workload engine 332 to deploy the workloads handling "CT1" "on prem L1." In turn, observability and assurance engine 406 may have configured data filters in the sidecar proxies to enforce access control. For instance, API calls using an authorization token with "scope 3" may be restricted to data consumers located "on prem L1."

Compliance engine 306 may process more elaborate data compliance rules than simply those illustrated, including the selection of specific locations for processing, storage, retention, and access for each category of sensitive data. For instance, a data team and/or application manager 304 may choose a specific data center (e.g., where their data warehouse is hosted), a compliant public or edge zone, a compliant private cloud or edge site, combinations of these, etc. While some of these selections may be very specific, others might remain openly declarative, which a member of SRE/IT team 310 may translate into a specific infrastructure request for deploying the application, or some of the services that comprise the application.

Some of the tokenization mechanisms described herein may be externally handled, such as by an authorization server, which may potentially work in concert with a delegated authorization solution (e.g., OAuth 2.0/OpenID Connect), a single sign-on (SSO) solution, etc. In such scenarios, the specific categories of tokens and scopes references in association tables 410 may be obtained from external systems.

In addition to the tokenization mechanisms, a data team and/or application manager 304 may also select the user and/or process groups that may have access to the different categories of sensitive data (e.g., read only, read and write, or no access). Such groups may be managed using internal tools or they may be externally handled by an authorization service (e.g., OKTA). In some embodiments, the selection of token scopes and the access rights applied to user and/or process groups may be made jointly. These additional constraints may also be part of the data compliance rules and state maintained by data compliance rule module 402.

In an alternative embodiment, compliance engine 306 may also enable the use of third-party annotations and/or data catalogs (e.g., imported from external data classification and tagging systems, such as from Collibra, OneTrust, or others). In such cases, the protected types used in protection bindings 424, and populated in association table 422, may be comprised of a set of annotation labels (i.e., metadata) added by application developers 312 (e.g., PT2, PT23 and CT1 in FIGS. 4A-4B) as well as third-party labels provided by external systems.

As such, DCaC implemented through architecture 400 may provide two levels of decoupling. First, a decoupling between the annotations or metadata embedded in the program code of the application as provided by application developers 312 at code/build time and the categories of sensitive data that may be selected and associated by a data team and/or application manager 304 before the annotated application 316 is deployed. Second, a decoupling between the categories of sensitive data and the rules selected by a data team and/or application manager 304, and the specific data compliance regulation and data compliance constraints that may apply to a given industry and/or region.

Such an approach may facilitate application developers' 312 proactively assisting a data team and/or application manager 304, while all of them are allowed to remain oblivious to the specificities and intricacies of the different data compliance regulations across the different industries and regions.

Figure 5:
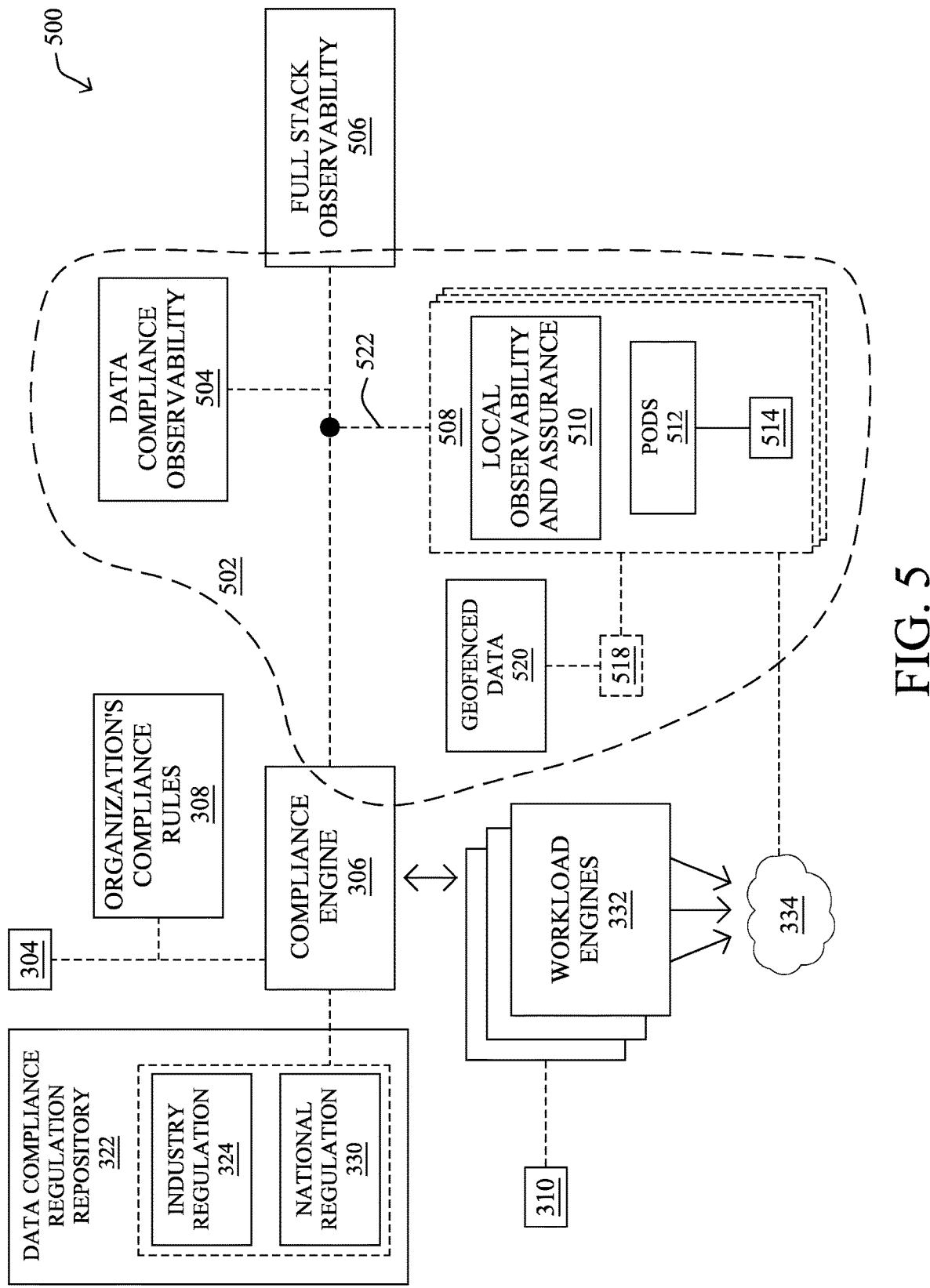
FIG. 5 illustrates an example architecture for data compliance and observability.

FIG. 5 illustrates an example architecture 500 for data compliance and observability, according to various embodiments. Architecture 500 may include data compliance and observability process 502. Data compliance and observability process 502 may be utilized to geofence data in heterogeneous cloud and edge environments at run time. Additionally, data compliance and observability process 502 may be utilized to provide observability into the access, processing, storage, and retention of the data, including data subject to sovereignty obligations and other compliance constraints. In various embodiments, data compliance and observability process 502 may execute these functions utilizing DCaC elements embedded in the program code of applications.

Architecture 500 may include compliance engine 306 and data compliance regulation repository 322. As described above, it may enable a data team and/or application manager 304 to select the target geographical area (e.g., state, country, or region, etc.), the target industry, and the data compliance rules that may be applicable at the organization level.

Different rules may apply to different types of data/categories of sensitive data. A mechanism may be utilized to differentiate between the different types of data/categories of sensitive data in order to selectively apply the different rules. As such, the data may be differentially classified and/or labeled.

For example, data discovery techniques, data categorization, classification, and tagging may be utilized to differentiate between the various different types of data/categories of sensitive data. However, in various embodiments, the DCaC model may be leveraged in order to differentiate between the various different types of data/categories of sensitive data on the basis of annotations embedded in the program code of the application and/or their corresponding data associations.

Compliance engine 306 may use these annotations and the corresponding associations to enforce compliance rules on the data. In this manner, the DCaC model provides a future-proof approach to compliance, since organizations using compliance engine 306 can quickly adjust to any ruleset, today and in the future, country by country, industry by industry, etc.

As described above, workload engines 332 may receive a request to deploy an application in a given region (e.g., from SRE/IT team 310). Workload engine 332 may issue a request to compliance engine 306, to compute and return the data compliance constraints that will be applied for that specific deployment. Alternatively, a data team and/or application manager 304 might select the compliance rules required, and a declarative intent for deploying the application might be issued from compliance engine 306 to one or more workload engines 332.

If the application deployment performed by the workload engines 332 is successful, several clusters 508 (e.g., a set of K8s or K3s clusters) may be spun up across various cloud and edge nodes. More specifically, such deployments might involve multi-cluster service meshes, which may run across multi-cloud and edge infrastructures 334. In various embodiments, clusters 508 may contain various pods 512 supporting the set of distributed services that compose the application (e.g., application services 514). Such services may comprise a service/data mesh 518, with instances running across various clouds and edges.

Clusters 508 and the application services 514 that they run may change over time. For instance, some workloads might be reallocated to another cloud or edge infrastructure (e.g., for cost or optimization reasons). Canary or alternative deployments might be instrumented to gradually transition to a new application or service version, which may change the traffic pattern of the data mesh 518. Security breaches might also produce deviations in traffic patterns. In addition, regulation might also evolve and change over time, creating new constraints to be enforced on the data mesh.

Overall, a data mesh 518 where application services are executed may change over time. These changes may impact where the data associated with these application services is processed, retained, and accessed. However, presently there are no existing mechanisms to dynamically adapt to changes in the data mesh 518 and/or changes in data compliance regulations that affect how data traffic in the data mesh should be processed. In contrast, in various embodiments introduced herein, data compliance and observability process 502 is executable to provide visibility and/or automated mechanisms across multi-cloud and edge to dynamically adapt a data mesh 518 upon possible changes in regulation, the configuration of compliance rules, or the applications themselves.

These functionalities may be implemented, at least in part, using local observability and assurance service 510. In various embodiments, each cluster 508 may run an instance of local observability and assurance service 510. The set of local observability and assurance services 510 executing across the clusters 508 may work in concert both with the compliance engine 306 as well as with full stack observability tool 506. The interplay between local observability and assurance services 510, compliance engine 306, and full stack observability tool 506 may be accomplished through interface 522. This interplay may support the observability (e.g., data compliance observability 504) and dynamic data geofencing (e.g., geofenced data 520) functions on the data mesh 518, as described in greater detail below.

Figure 6:
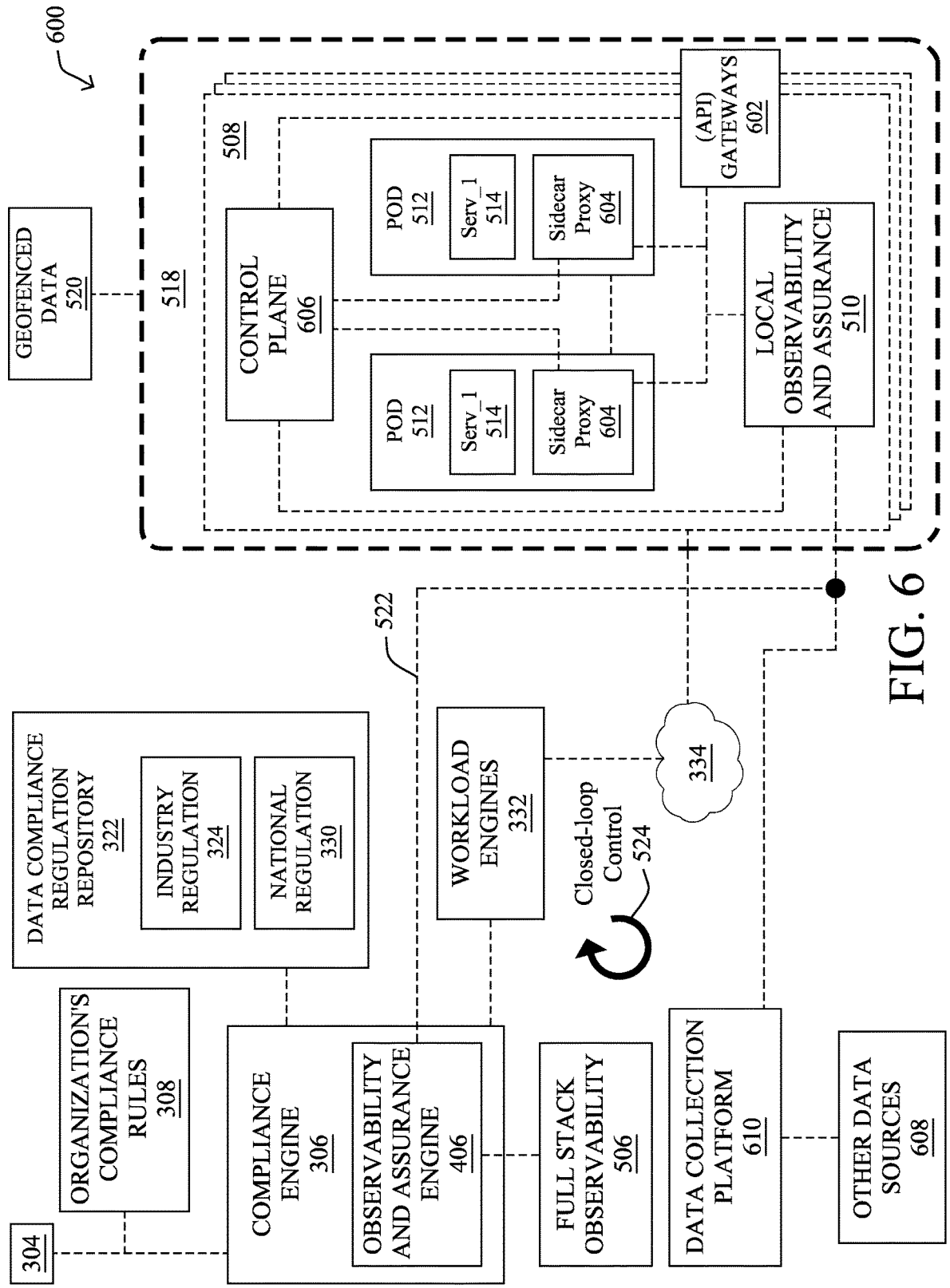
FIG. 6 illustrates an example architecture for data compliance and observability.

FIG. 6 illustrates an example architecture 600 for data compliance and observability according to various embodiments. The architecture 600 may include the set of clusters 508 that may run on multi-cloud and edge infrastructures 334. The set of clusters 508 may include components constituting control and data planes. For instance, each pod 512 within cluster 508 may be composed of a set of services 514 that implement the business logic of the application (e.g., application service 514 "Serv_1" in one pod 512 might implement part of this logic).

Architecture 600 may include an automated mechanism to decouple ancillary functions from the application business logic. This decoupling may be especially relevant for cloud/edge native applications, which are increasingly being implemented as a set of workloads composing a service mesh.

For example, a service mesh may include a set of application services 514 (e.g., Serv_1, . . . , Serv_n) that implement the business logic along with a set of interconnected sidecar proxies 604 associated to each one of those application services 514. Sidecar proxies 604 (e.g., an Envoy proxy) may decouple ancillary functions from the application's business logic, such as routing control, proxying and securing the communications between the services at the data plane level, collecting and reporting telemetry data on the service mesh, load balancing, managing retries, etc.

Control plane 606 may manage and configure sidecar proxies 604, including, for example, the capacity to push routing rules to control and block traffic at run time. In some examples, control plane 606 may be an Istio control plane. The control plane 606 may be used for fine-grained traffic control for HTTP, gRPC, TCP, and other types of traffic. In some embodiments, the control plane 606 may also include controls for the gateways and/or other API gateways 602 that may support communications across the different clusters 508 composing the service mesh.

Control plane 606 and sidecar proxies 604 may also provide native functions to decouple the configuration, observability, and enforcement of data compliance rules from the application business logic. However, these capabilities are not limited to a service mesh nor to the use of sidecar proxies 604 and can be applied to any type of data mesh. For instance, the functions enabling observability and the enforcement of data. compliance rules might be embedded in the sidecar proxies 604 themselves.

Alternatively, the decoupling of data compliance from the application's business logic might be implemented without using sidecar proxies 604. In such cases, this functionality might be embedded in other portable processes. For instance, the functionality may be achieved utilizing client libraries, daemons working in tandem with application-specific services, sandboxed programs in the OS kernel (e.g., using the Extended Berkeley Packet Filter or eBPF), or an agentless model, or by embedding such functionality in the Kubernetes control plane itself.

In various embodiments, the configuration, observability, and enforcement of data compliance rules, etc. functionalities may be decoupled from sidecar proxies 604 and implemented as local compliance controllers deployed within the service/data mesh 518 through a set of local observability and assurance services 510. For example, each cluster 508 may include a local observability and assurance service 510 deployed together with the application pods 512. This decoupled functionality may provide the portability and reuse of observability and enforcement of data compliance functions across not only different applications but also cloud and edge environments.

Local observability and assurance service 510 may act as a local control point enabling the enforcement of data geofencing and observability of data compliance at run dine (i.e., in real time). Such functionality may be implemented in various ways. For example, by leveraging filters (e.g., Envoy filters) and external logic interfacing with the sidecar proxies 604 based on an instruction format such as WebAssembly. This pluggable extension model may also facilitate the enforcement of data compliance rules and the collection of specific observations for traffic of interest in the service/data mesh 518.

To this end, each local observability and assurance service 510 may interface both with the sidecar proxies 604 and control plane 606. Sidecar proxies 604 may support the collection of telemetry data with specific focus on data compliance, while control plane 606 may facilitate the configuration and enforcement of traffic policy on the sidecar proxies 604 and the API gateways 602, thereby enabling data geofencing based on the data compliance rules defined. These controls on the service data mesh 518 traffic may exercised at run time. The controls may include hot reconfiguration and reloading of telemetry and data compliance rules.

In some embodiments, the traffic across the service/data mesh 518 may be encrypted beforehand, including the application-layer headers. In such cases, each sidecar proxy 604 may terminate, decrypt, enforce traffic controls, and either block or encrypt and forward the traffic to the next service in the mesh. Other embodiments may also use the local observability and assurance services 510, but instead of interfacing with the sidecar proxies 604, they may interface with client libraries, or daemons, or with filtering functionality supported by eBPF, or directly by the Kubernetes control plane, as described above.

The set of local observability and assurance services 510 in the clusters 508 may interface with observability and assurance engine 406, which may be part of compliance engine 306. While workload engine 332 may receive a set of data compliance requirements as an input to restrict (e.g., geofence) the placement of workloads at deploy time, the push and update of compliance-specific configuration to the local observability and assurance services 510 may be out of the scope of a workload engine 332. Hence, each local observability and assurance service 510 may leverage interface 522 to register with observability and assurance engine 406 to receive compliance-specific configuration and updates.

Once a configuration phase (e.g., registration with observability and assurance engine 406, etc.) is completed, local observability and assurance services 510 may process and send events to the observability and assurance engine 406 through interface 522 (e.g., capturing relevant observations locally, including data access requests that were blocked, potential attempts to deviate from the compliance rules configured, anomalies detected, etc.). Moreover, local observability and assurance services 510 may also operate and buffer events even when backhaul connectivity to observability and assurance engine 406 is lost. The continued operating and buffering functionalities of local observability and assurance services 510 may be utilized, for example, in many edge environments, where connectivity to the backends and/or the cloud might not be reliable or always available.

In various embodiments, local observability and assurance services 510 may interface with observability and assurance engine 406 to get configuration and updates, while it may interface with full stack observability tool 506, such as Cisco's Full Stack Observability solution, to push events yield by the observability function. This approach may be utilized to add data compliance implementation and/or observation to application observability stacks. In additional embodiments, local observability and assurance services 510 may interface additionally or alternatively directly with observability and assurance engine 406, which in turn may interface with full stack observability tool 506.

The observability and assurance components may be implemented as a distributed function across multi-cloud and edge infrastructures 334. For example, Local observability and assurance services 510 may interface both with a data collection platform 610 as well as with observability and assurance engine 406. Data collection platform 610 may operate as a common element that gathers, formats, and feeds data to full stack observability tool 506. Other data sources 608 may also supply data to data collection platform 610. For instance, telemetry and events from other monitoring systems, such as Cisco's ThousandEyes, workload engines 332, a service mesh manager, etc. may be supplied to data collection platform 610.

Local observability and assurance services 510 may send events, logs, and other metrics related to data compliance to data collection platform 610. As a result, the full stack observability tool 506 may add data compliance to the observability stack. Observability and assurance engine 406 may also interface with the full stack observability tool 506 to provide this functionality. Therefore, observability and assurance engine 406 may not only communicate the targeted state of data compliance policies for a given application to the full stack observability tool 506, but it may also allow the full stack observability tool 506 to notify the observability and assurance engine 406 upon any deviations or potential issues based on observations and analysis made across the full stack.

Such notifications may be used by the observability and assurance engine 406 to dynamically update the configuration of data compliance rules in one, or several, of the local observability and assurance services 510 in the clusters 508. Local observability and assurance services 510, full stack observability tool 506, and observability and assurance engine 406 may operate in closed-loop 524 mode, thereby enabling dynamic control of data compliance rules and data geofencing (e.g., geofenced data 520) in real time.

Figure 7:
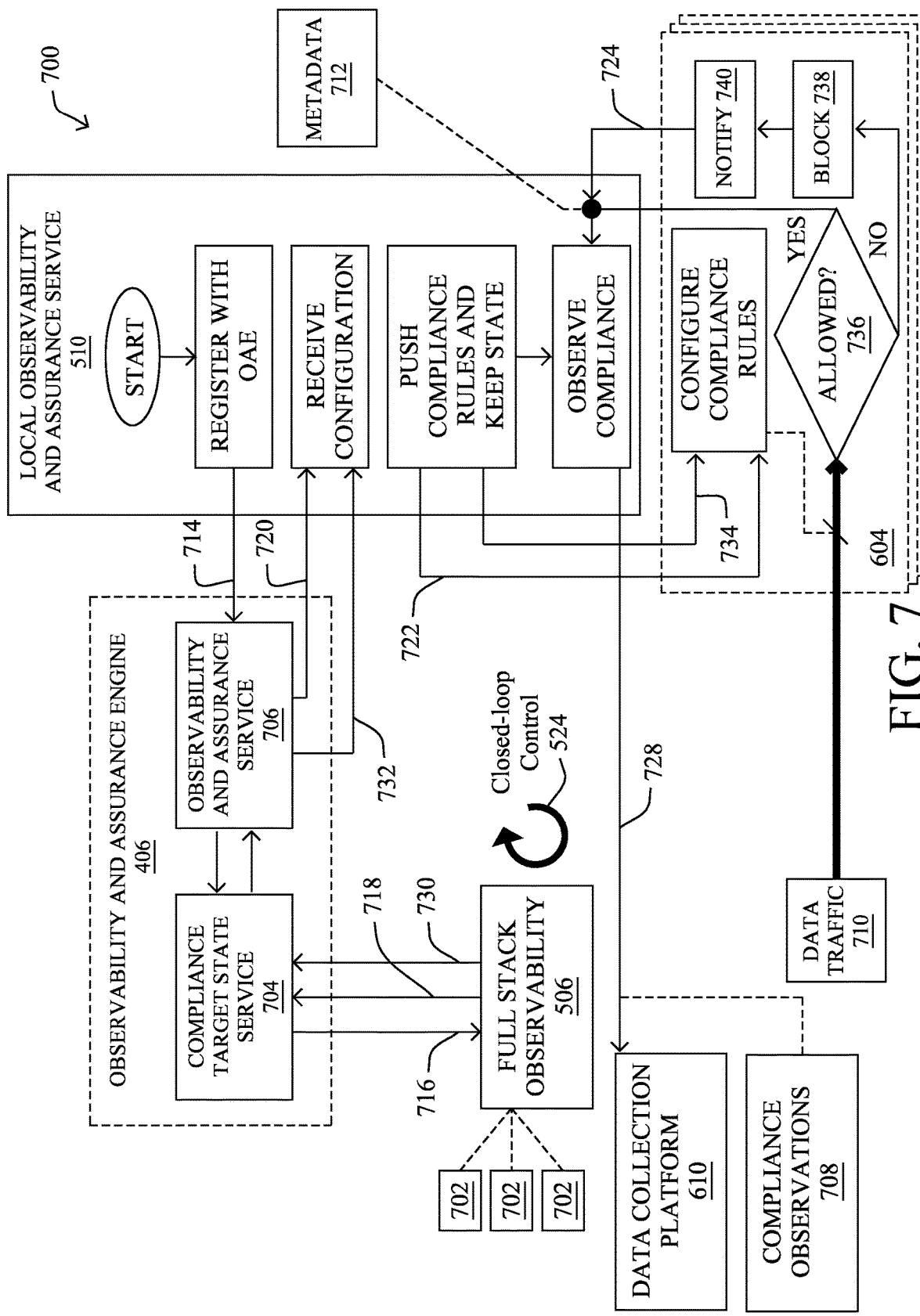
FIG. 7 illustrates an example architecture and procedure for data compliance and observability.

FIG. 7 illustrates an example process 700 for data compliance and observability according to various embodiments. Process 700 may be executing utilizing the above-described observability and assurance components including the observability and assurance engine 406, local observability and assurance service 510, sidecar proxies 604, data collection platform 610, and full stack observability tool 506, which may be cooperatively operated to provide data handling (e.g., data geofencing) and observability thereof according to predefined data compliance rules in real time both at intra- and inter-cluster level across hybrid cloud and edge infrastructures.

For example, local observability and assurance service 510 may be deployed in a service mesh. Once local observability and assurance service 510 is deployed, it may, at 714, register with observability and assurance service 706. Observability and assurance service 706 may be part of observability and assurance engine 406.

Observability and assurance engine 406 may include a compliance target state service 704, which may mange the data compliance rules and desired states for various organizations across different regions, concurrently. The targeted compliance state may include a target compliance configuration determined from the data compliance rules selected by data team and/or application managers and/or their corresponding data handling constraints computed by the compliance engine (e.g., compliance engine 306 in FIG. 6).

At 716, observability and assurance engine 406 may push a targeted compliance state to full stack observability tool 506. For example, Observability and assurance engine 406 may push the targeted compliance state for each category of sensitive data that may be subject to the data compliance rules defined by a data team and/or application manager 304, and the corresponding data handling constraints computed by the compliance engine 306 and sent to full stack observability tool 506.

Full stack observability tool 506 may be configured to monitor resulting data. meshes 702 of different categories of sensitive data for potential variations from their corresponding targeted compliance state. Additionally, at 718, full stack observability tool 506 may confirm the reception and preparation to observe the resulting data meshes 702 and potential variations from their corresponding desired states.

At 720, observability and assurance engine 406 may send the targeted compliance configuration to local observability and assurance service 510. In turn, local observability and assurance service 510 may retain the targeted compliance states and, at 722, push the corresponding targeted compliance configuration to a set of local services that may filter the data/service mesh for each category of sensitive data. For example, local Observability and assurance service 510 may push targeted compliance states to sidecar proxies 604 or alternative models such as client libraries, daemons, etc.

Additionally, local observability and assurance service 510 may prepare and configure its observability module to send any relevant notifications (e.g., observations of data compliance policy violations, deviations from established patterns of behavior, suspicious activity, etc.) to data collection platform 610. In various embodiments, local observability and assurance service 510 may monitor traffic associated with the application services and/or determine whether the observed data traffic violates a data compliance policy (e.g., deviates from an established pattern of behavior, violates the targeted compliance configuration for a category of sensitive data, exhibits suspicious traffic patterns, etc.).

The targeted compliance configurations pushed to the set of local services, at 722, may be utilized to configure corresponding data compliance filters for an application service. Specifically, a data compliance filter may be configured to enforce the targeted compliance configurations (e.g., compliance rules) by filtering data traffic 710 corresponding to the category of sensitive data in the data mesh where application services for the application are executing. In various embodiments, the data compliance filter, once configured, may be applied to the data traffic 710 to restrict sensitive data in the data traffic 710 from being processed by particular application services (e.g., located in a particular geographic location).

In some examples, the data compliance filters may be Envoy filters. For example, a filter may be implemented in a filter chain. The filter may be associated with a listener that listens on a port associated with an application service. The filter may detect data. traffic 710. Data traffic 710 may include connections, requests, other data, etc. directed to the application services in the mesh.

The filter may then determine whether the detected data traffic 710 will violate one or more of the target data compliance configurations configured into the filter and/or if the detected data traffic 710 is allowed by the target data compliance configurations. The filter may then make a routing decision based on the determination.

For example, if at 736 it is determined that data traffic 710 is allowed (e.g., "Yes"), then the filter may pass data traffic 710 on (e.g., to a next filter in the filter chain, to its destination application service, etc.) and/or report the allowance of data traffic 710 to local observability and assurance service 510. In contrast, if at 736 it is determined that data traffic 710 is not allowed (e.g., "No") then the filter may block, at 738, data traffic 710 and/or may notify, at 740, local observability and assurance service 510 that data traffic 710 was blocked.

At 724, once the data compliance filters are configured, local observability and assurance service 510 may observe the traffic and data exchanged across the different application services in the data/service mesh. In various embodiments such observations may be received in the form of metadata 712. For example, the metadata 712 may be collected by and/or received from tools, APIs, SDKs, etc. used to instrument, generate, collect, export, etc. telemetry data (metrics, logs, traces, etc.), such as OpenTelemetry/OpenTracing.

At 728, upon detection of any suspicious behavior, variations from the targeted compliance states for any category of sensitive data, etc., local observability and assurance service 510 may notify full stack observability tool 506, via data collection platform 610, of the detection. In some examples, the notification may include compliance observations 708. Compliance observations 708 may include relevant portions of the observed metadata 712. Compliance observations 708 may also include notifications of blocked data traffic 710 that was reported to local observability and assurance service 510.

At 730, the notifications received by full stack observability tool 506 through data collection platform 610 may be sent to observability and assurance service 706. At 732, receiving the notification at observability and assurance service 706 may trigger observability and assurance service 706 to push new and/or modified data compliance rules to local observability and assurance service 510.

The new and/or modified data compliance rules may be a and/or modified set of targeted compliance states for a category of sensitive data. In various embodiments, the new and/or modified data compliance rules may include changes to the previous set of targeted compliance states that are designed to address and/or remedy a detected issue identified in the notification received at observability and assurance service 706. This may include modifications to how data is handled (e.g., modifications to what type of data is included in a category of sensitive data, modification to how categories of sensitive data are handled by filters, modifications to which data is geofenced and/or how it is geofenced, modifications to which application services are allowed to handle specific types of data, etc.).

At 734, the new and/or modified rules pushed to the local observability and assurance service 510 may be utilized to reconfigure the data compliance filters in the service/data mesh. For example, the filters may be modified so that they filter data traffic 710 according to the new and/or modified data compliance rules.

The techniques described with respect to 724, 728, 730, 732, and 734 may be utilized for performing data compliance observability and geofencing functions in real time while providing continuous assessment and a closed-loop 524 control of the data compliance state.

While the examples shown in FIG. 7 are mainly focused on observability and policy enforcement for data in transit 710, those skilled in the art would understand that the techniques described herein may also be applied to data at rest (e.g., to control data storage and retention policies for specific categories of data) as well as to data in use (e.g., for controlling data processing by an application service 514, using processor 220 and memory 240 within device 200).

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

As noted above, the number of laws, regulations, and rules regarding the storage and use of certain types of data are continually increasing globally. For instance, "data sovereignty" obligations may demand that certain categories of data in a particular country must be processed, stored, and accessed within the borders of that country. The increased proliferation of data localization and sovereignty regulations is posing complex challenges to the organizations that use or manage that data.

Ensuring that online applications and their corresponding data can be accessed, viewed, and processed from anywhere, anytime, and from any device in a manner that meets legal obligations and constraints increasingly involves complex data handling considerations that vary from industry-to-industry, geographical location-to-geographical location, and/or organization-to-organization, etc. For example, legal obligations and constraints regarding data handling usually vary from country-to-country. In addition, data compliance requirements are often not limited to data sovereignty obligations. Depending on the type of application, data compliance may demand the amalgamation of other requirements, such as industry-specific regulation (e.g., complying with HIPAA obligations in the healthcare industry in the US), or organization-specific compliance rules (e.g., on how to handle confidential information, i.e., data that might not be regulated by the law). In this legislative landscape, for certain categories of data, the "anywhere, anytime, and from any device" model will no longer be feasible in several regions.

Moreover, applications are increasingly being developed or refactored as a set of distributed services running on clusters across various clouds and edge infrastructures (e.g., cloud-hosted applications). Ensuring that data sovereignty obligations and other compliance rules are met across various public and private clouds and edges is a major challenge for organizations, especially, when data consumers and/or producers might be on the move. For example, mobile data consumers and/or producers have the ability to move in and out of geographical regions which have different, and sometimes conflicting, data handling requirements.

For example, a certain law may require user data generated in a particular country to remain within the borders of that country. As such, a data consumer may comply with the law while consuming the data in the particular country but then may violate the law upon moving outside the borders of that country.

Existing data compliance strategies have no insight into what type of data is being shared and/or used by an application and instead rely on external post-hoc analysis to determine what type of data was shared and/or used. These strategies may include restricting data residency to specific infrastructure providers to try to address data residency issues. However, these solutions do not address instances when data consuming or producing endpoints are located outside the service clusters and/or are moving.

Dynamic Resolution and Enforcement of Data Compliance

The techniques herein introduce mechanisms for dynamic resolution and enforcement of data sovereignty and other data compliance rules for online applications at run time and/or with mobile data consumers and producers. These techniques provide automatic adaptation to different geographical locations and amalgamate various rules, including state, province, country, and multi-country specific obligations, industry-specific regulation, as well as rules specifically defined by an organization. The techniques described herein cover applications deployed across heterogeneous multi-cloud and edge infrastructures and may be utilized when the endpoints that may consume, produce, and/or process the application data might not only be located outside the service clusters but also on the move.

Illustratively, the techniques described herein may be performed by hardware, software, and/or firmware, such as in accordance with data compliance resolution and enforcement process 248, which may include computer executable instructions executed by the processor 220 (or independent processor of interfaces 210) to perform functions is relating to the techniques described herein.

Specifically, according to various embodiments, a device may obtain a location of an endpoint that communicates with an application service. The device may match the location of the endpoint to a data compliance policy. The device may identify sensitive data within the application service to which the data compliance policy applies. The device may configure the application service to permit the endpoint to at least one of access or send the sensitive data when permitted by the data compliance policy.

Operationally, in some embodiments the techniques herein propose the use of a posture service in conjunction with data compliance architecture. For example, in FIG. 5 an example architecture 500 for data compliance and observability is illustrated. With respect to example architecture 500, a posture service may be added. The posture service may be part of (e.g., from the same set of instructions as, executed by a same device as, etc.) or separate from (e.g., from a distinct set of instructions as, executed by a different device than, etc.) compliance engine 306, and/or specifically the observability and assurance engine portion of compliance engine.

The posture service may be communicably coupled to endpoints. Endpoints may include clients, processes, and/or computing devices which may consume and/or process data contained in service/data mesh 518. In some examples, the endpoints may be external endpoints. External endpoints may include clients, processes, and/or computing devices hosted and/or residing outside service/data mesh 518. Likewise, data created or processed by external endpoints might be utilized by service/data mesh 518 (e.g., data processed externally might be pushed to update certain data records in the service/data mesh 518).

As described above, to ensure that data handling requirements are compliant not only with data sovereignty and industry-specific obligations but also with organization's compliance rules 308 defined by the organization, each cluster 508 may run local observability and assurance service 510. The set of local observability and assurance services 510 may be managed by observability and assurance engine 406, which may be part of compliance engine 306. In turn, the observability and assurance engine of compliance engine 306 may leverage the posture service to garner information about the external endpoints and the application service/data mesh 518.

For example, posture service may be utilized by observability and assurance engine to support the dynamic resolution and enforcement of data compliance functions on the service/data mesh 518. Specifically, the posture service may be utilized to ensure the resolution and enforcement of data compliance constraints at run time including among the endpoints. For example, posture service may be utilized to forward posture data regarding the endpoints to compliance engine 306 to conduct compliance-specific posture assessments. In various embodiments, the posture service may provide posture data indicative of a geographical location of an endpoint, data indicative of a mobility pattern of an endpoint, data indicative of whether an endpoint is utilizing a VPN, details on an API call made by an endpoint, etc. to compliance engine 306 to conduct compliance-specific posture assessments. As such, the posture service may be utilized to provide dynamic resolution and enforcement of data compliance of endpoints.

Figure 8:
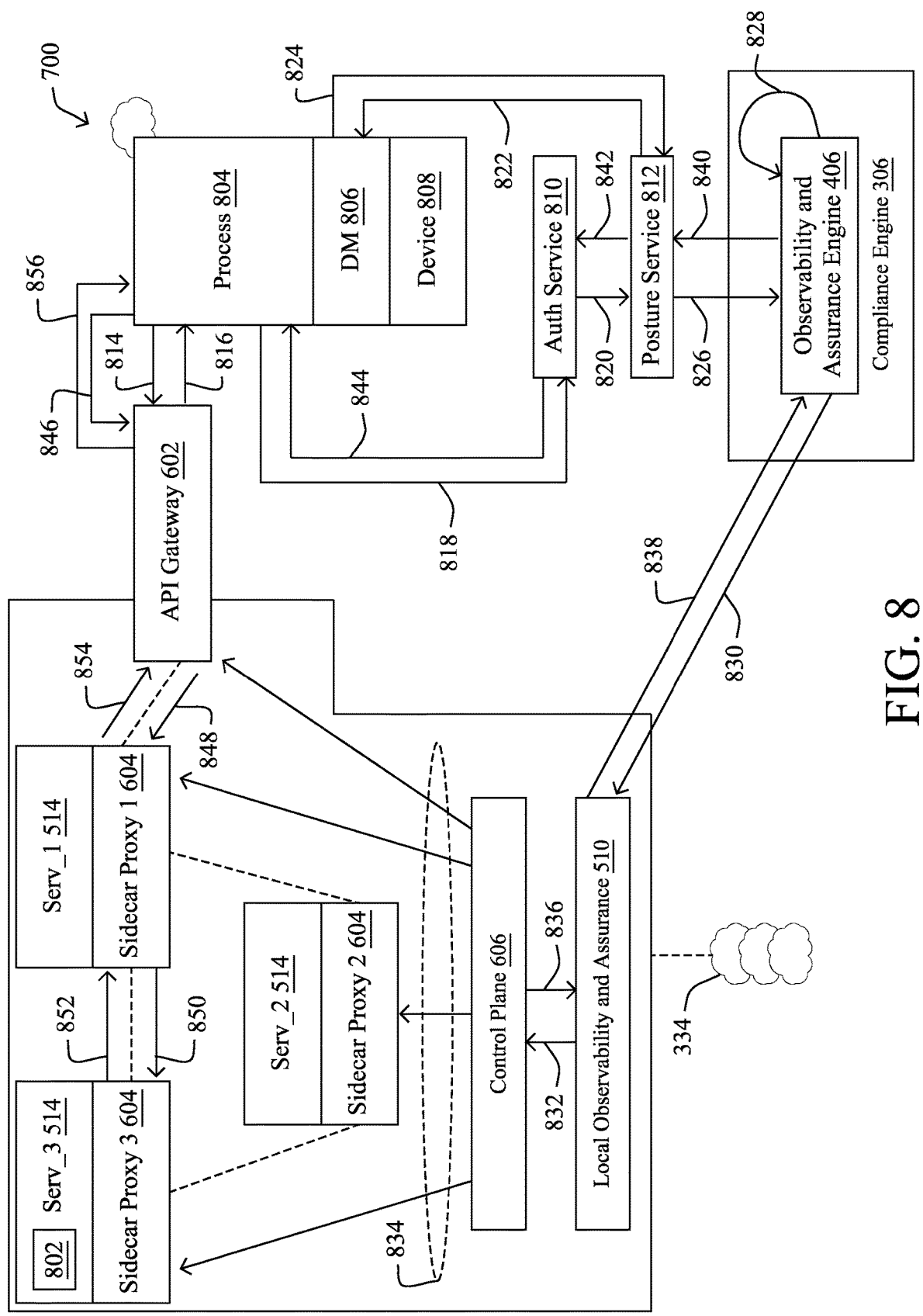
FIG. 8 illustrates an example architecture and procedure for dynamic resolution and enforcement of data compliance with endpoints.

FIG. 8 illustrates an example architecture and procedure 800 utilizable for dynamic resolution and enforcement of data compliance of endpoints, according to various embodiments. The procedure 800 may include functions that support the dynamic resolution and enforcement of data compliance functions on an application's service/data mesh (e.g., service/data mesh 518 of FIG. 5). For example, procedure 800 may include interactions between local observability and assurance services 510 (e.g., running locally in each cluster 508), observability and assurance engine 406, and posture service 812 ensuring the resolution and enforcement of data compliance constraints involving endpoints 808 at run time.

As described above, endpoints 808 may include clients and/or devices, which may be external endpoints. Endpoints 808 may be executing a process 804. Process 804 may attempt to send or access data that is part of a service/data mesh supported by clusters 508. The data in/for the service/ data mesh may include various types of data associated with various application services 514 in the cluster 508. Some of this data may be non-sensitive data that is not subject to particular data handling rules or regulations, and which may be considered a non-protected data resource which endpoints 808 are authorized to access and/or process regardless of their location. However, some of this data may be sensitive data (e.g., protected data). Sensitive data may be considered and/or stored at a protected data resource 802. Procedure 800 may be utilized to ensure that a particular access of protected data resource 802 by an endpoint 808 complies with relevant data compliance regulations.

At 814, a process 804, executing at endpoint 808, may request access to a protected data resource 802. Protected data resource 802 may include data associated with an application service 514 (e.g., application service "Serv_3") executing in cluster 508. In various embodiments, process 804 may issue and API call (e.g., using a GET method) to access the protected data resource 802. The API call may be communicated to and/or through API gateway 602 of cluster 508. Again, in some examples, endpoint 808 may be an external endpoint executing outside of cluster 508 and/or the service/data mesh.

At 816, API gateway 602 may receive the API call requesting access to protected data resource 802. However, alternative processes may be utilized for receiving and/or responding to a request to access a protected data resource 802 by an endpoint 808. Regardless of how the access request is sent or received, it may be directed to an authentication and authorization service. For example, the process 804 may be redirected to authentication (AuthN) and authorization (AuthZ) service 810.

At 818, the process 804 may attempt authentication with AuthN and AuthZ service 810. The authentication may, once successful, provide endpoint 808 and/or its process 804 with an authorization to access protected data resource 802. For instance, AuthN and AuthZ service 810 may require an authentication—before issuing an authorization to endpoint 808 and/or its process 804 to access protected data resource 802.

At 820, AuthN and AuthZ service 810 may pass data regarding endpoint 808, process 804, protected data resource 802, the access request for protected data resource 802, etc. to a posture service 812 to evaluate the posture of endpoint 808 and/or process 804. For example, AuthN and AuthZ service 810 may require the collection of posture information before granting an authorization to access. Posture information may include attributes of the endpoint 808 that play a role in data compliance.

For example, posture information may include various attributes collected about and/or from the endpoint 808 that may be evaluated against a set of rules defining a data compliance regulation. In order to initiate evaluation of the posture of endpoint 808 and/or process 804, AuthN and AuthZ service 810 may pass a client ID and additional metadata associated with the access request to posture service 812 (e.g., including details on the API call, the method used, the uniform resource identifier (URI) which may include a reference to annotated data, such as "protected-type-1", etc.). As described in detail above, the data annotations may be those embedded into the program code of the application as part of the DCaC model. As such, the URN may reference these annotations as part of normal operation of the application.

At 822, posture service 812 may utilize the information received from AuthN and AuthZ service 810 to send a challenge to endpoint 808 and collect relevant information from endpoint 808. For example, posture service 812 may collect a current geographical location of endpoint 808. In addition, posture service 812 may collect an indication of whether endpoint 808 is mobile and/or moving, a vector of endpoint 808 movement, a heading of endpoint 808 movement, a speed of endpoint 808 movement, a historical mobility pattern of endpoint 808 movement, etc.

In various embodiments, posture service 812 may perform these functions in cooperation with an identifiable and trusted software element such as device management (DM) module 806. DM module 806 may be a client-side/device-side module, such as a mobile device management (MDM) software module for mobile computing devices, executing at endpoint 808. In instances when DM module 806 on the endpoint 808 is unavailable, inoperable, outdated, unreachable, etc., posture service 812 may notify AuthN and AuthZ service 810 and the request to access protected data resource 802 may be denied.

At 824, DM module 806 may provide signed responses that are responsive to the challenge received from posture service 812 back to posture service 812. For example, when DM module 806 is reachable by posture service 812, DM module 806 may send a signed response, which may include client ID, device ID, user ID (if relevant, though it might not be relevant for headless devices or processes), IP address, MAC address, and may specifically include VPN-related metadata and detailed location information (e.g., GPS coordinates), etc. related to endpoint 808, process 804, and/or the request to access protected data resource 802. Again, if no signed responses are provided by DM module 806, then AuthN and AuthZ service 810 may be notified and/or access to the data resource 802 might be denied directly.

The posture of the endpoints 808 may be assessed explicitly considering its current location and/or their possible connectivity via VPN. This may involve a signed proof of location and/or explicit verification that process 804 is not attempting to access protected data resource 802 via a VPN. A trusted DM module 806 may securely garner the relevant data from the endpoint 808 and generate signed responses that act as proofs, which posture service 812 may verify in real time.

Specific conditions may be applied to ensure that metadata exchanged between posture service 812 and DM module 806 are compliant with the relevant regulations (e.g., the local regulations where the service/data mesh is running). For instance, in various embodiments, posture service 812 may challenge a trusted DM module 806 with a test. For example, posture service 812 may challenge DM module 806 with a test such as "if (GPS coordinates are within country X==True) && (VPN status disconnected==True), then DM_RESPONSE=OK, else DM_RESPONSE=NA." This challenge may avoid exchanging any metadata when the device is outside the country and/or using a VPN service. Additionally, posture service 812 may challenge DM module 806 with a test such as "if RESPONSE==OK, then send CHALLENGE and get metadata, else respond to AuthN and AuthZ service 810 that access to data resource 802 must be denied."

At 826, posture service 812 may communicate data collected in this exchange to an observability and assurance engine 406 component of compliance engine 306. For example, in the case where posture service 812 was able to collect the posture data from the endpoint 808, posture service 812 may convey the data garnered to observability and assurance engine 406. The data conveyed may include details on the API call, the method used, the URI which in turn may include a reference to annotated data, such as "protected-type-1", etc. Hence, in contrast to posture systems which respond directly to an authorization service, posture service 214 may forward the data collected and additional metadata to compliance engine 306 to conduct compliance-specific posture assessments. In addition, posture service 812 may communicate such data as an indication of whether endpoint 808 is mobile and/or moving, a vector of endpoint 808 movement, a heading of endpoint 808 movement, a speed of endpoint 808 movement, a historical mobility pattern of endpoint 808 movement, etc.

At 828, observability and assurance engine 406 may perform the compliance-specific posture assessment. The compliance-specific posture assessment may include identifying sensitive data within the application to which a data compliance policy applies and/or matching the location of the endpoint to data handling location constraints in the data compliance policy.

For example, observability and assurance engine 406 may utilize the posture data provided at 826 to perform a compliance check. For instance, the data access request may be an API call based on a GET method to access data annotated as "protected-type-1" utilizing the DCaC model. Leveraging the DCaC model's embedded annotations and associations, compliance engine 306 may translate the request to access data annotated as "protected-type-1" into a request to access protected "Customer PII" data. Therefore, in contrast to authorization and posture systems that neither amalgamate data sovereignty obligations, industry-specific regulations and organization's rules nor include these elements as key inputs to assess the data transaction's posture, observability and assurance engine 406 may explicitly integrate these elements and compute the corresponding data compliance constraints in real time (e.g., to grant authorization to an external endpoint 808 to access "Customer PII" data).

In various embodiments, observability and assurance engine 406 may reference data compliance rules implicated by a category of sensitive data. For example, data compliance rules associated with "Customer PII" data may be referenced in order to determine whether the posture of the endpoint 808 requesting access to the protected data resource 802 comports with and/or is allowable under (e.g., does not violate) the data compliance rules designated as applicable to "Customer PII" data.

If the observability and assurance engine 406 determines that the current posture of the endpoint 808 and/or a predicted posture of an endpoint 808 (e.g., a predicted future geographical location of an endpoint 808 based on movement of the endpoint 808 may be outside of a geographical location where the endpoint is permitted to access the data under relevant data compliance rules) will violate a data compliance rule associated with the category of sensitive data, then it may notify posture service 812 of the conflict. Posture service 812 may, in turn, convey a posture response to AuthN and AuthZ service 810 preventing an authorization of process 804 to access the protected data resource 802.

Conversely, the observability and assurance engine 406 may determine that access to a protected data resource 802 should be granted to process 804. For example, observability and assurance engine 406 may determine that a current posture of the endpoint 808 and/or a predicted posture of an endpoint complies with a data compliance rule associated with the "Customer PII" category of sensitive data.

In such instances, observability and assurance engine 406 may, at 830, determine the data handling constraints that should be applied to the clusters and push the required data handling configuration to the corresponding set of local observability and assurance services 510. The observability and assurance engine 406 may determine the applicable data handling constraints from, for example, a target compliance configuration determined from the data compliance rules selected by a data team and/or application manager 304 and/or their corresponding data handling constraints computed by the compliance engine 306. in pushing the required data handling configuration to the corresponding set of local observability and assurance services 510, observability and assurance engine 406 may configure the application to permit the endpoint to access the sensitive data as permitted by the data compliance policy.

At 832, local observability and assurance services 510 may push the required data handling configuration to control plane 606. In some examples, control plane 606 may be an Istio control plane. At 834, control plane 606 may push new filters, configured according to the required configuration, to a set of sidecar proxies 604. In some examples, the sidecar proxies may be Envoy proxies. The filters may be deployable by the sidecar proxies 604 to facilitate the decoupling of data compliance from the business logic of the application services 514 (e.g., Serv_1, Serv_2, etc.). In various embodiments, control plane 606 may, at 834, additionally or alternatively push the required configuration to the API gateways 602. Once the configuration of the filters and the rules by the sidecar proxies 604 is finished, control plane 606 may, at 836, notify local observability and assurance services 510, which in turn may notify, at 838, observability and assurance engine 406.

In some embodiments, the configuration of the filters in the sidecar proxies 604 and the API gateways 602 might be pushed directly by local observability and assurance services 510. As such control plane 606 and/or sidecar proxies 604 may provide a native function to decouple the configuration and enforcement of data compliance rules from the application business logic. However, these techniques are limited neither to a service mesh nor to the use of sidecar proxies and can be applied to any type of data mesh.

For instance, the functions enabling the enforcement of data compliance rules might be embedded in the sidecar proxies 604 themselves, In an alternative embodiment, the decoupling of data compliance from the application's business logic might be implemented without using sidecar proxies 604. In such cases, this functionality might be embedded in other portable processes. For instance, using client libraries, daemons working in tandem with application-specific services, sandboxed programs in the OS kernel (e.g., using the Extended Berkeley Packet Filter or eBPF), or an agentless model, or by embedding such functionality in the Kubernetes control plane itself.

In other embodiments, such functionality might be decoupled from the sidecar proxies 604 and implemented as local compliance controllers deployed within the service/data mesh, that is, through a set of local observability and assurance services 510. Each cluster 508 may include a local observability and assurance service 510 deployed together with the application pods. In any case, the functionality introduced herein may enable the portability and reuse of data compliance enforcement functions across not only different applications but also multi-cloud and edge infrastructures 334.

At 840, observability and assurance engine 406 may notify posture service 812 of the result of the compliance-specific posture assessment. For example, local observability and assurance service 510 may notify posture service 812 of its determination that access to a protected data resource 802 should be granted to process 804, Additionally, observability and assurance engine 406 may notify posture service 812 that the configuration of the filters and the rules by the sidecar proxies 604 in cluster 508 is finished.

At 842, posture service 812 may convey a posture response to AuthN and AuthZ service 810. The posture response may include an indication that access to protected data resource 802 should be granted to process 804.

At 844, AuthN and AuthZ service 810 may, responsive to the posture response, issue an authorization to endpoint 808. The authorization may grant process 804 access to protected data resource 802. For example, AuthN and AuthZ service 810 may also represent a token endpoint and may issue an authorization token to endpoint 808. In various embodiments, the token may be based on the token/scope associations defined in compliance engine 306. For example, the token may be the token specified in the association table 422 and/or protection binding 424 for accessing the category of sensitive data stored in protected data resource 802.

At 846, 848, and 850, process 804 may attempt to access protected data resource 802 via a route through the service/data mesh. Process 804 may utilize the authorization token granted by AuthN and AuthZ service 810 to attempt to access protected data resource 802. If the authorization token is successfully verified, then such access may be granted.

At 852, 854, and 856 the data retrieved from protected data resource 802 may be routed back through the service/data mesh to the endpoint 808. For example, responsive to the authorization token being successfully verified, the data at protected data resource 802 may be accessed and returned to endpoint 808 for use in process 804.

In additional embodiments, a protected data resource 802 may be data resulting from processing performed by the endpoint 808, and in this case, the data access requestor (i.e., the consumer endpoint) may be a process 804 now running within the service/data mesh where the cluster 508 is executing. In such scenarios, devices, and ancillary services such as SPIFFE/SPIRE managing the application workloads might also have DM modules and might also support remote attestations from posture service 812. Hence, a similar flow as the one illustrated in the example of FIG. 8 may apply when the consumer endpoints reside in the service/data mesh and the data producers are located outside the service/data mesh. Indeed, posture service 812 may assess the data transaction's posture by considering the posture of both communication endpoints while FIG. 8 may illustrate a data consumption example from a mobile endpoint, it is additionally contemplated that posture service 812 may compute the relative location of the two endpoints so that compliance engine 306 may apply a policy covering bidirectional communication such as both data producer and data consumer scenarios).

In further embodiments, observability and assurance engine 406 may push a policy to posture service 812, so that posture service 812 can cache the result of the compliance-specific posture assessment. In this manner, the processes of 826, 828, 830, 832, 834, 836, 838, and 840 may be avoided when future data access request match previous (historically known and authorized) posture conditions. Moreover, observability and assurance engine 406 may flush or override posture service 812's cache dynamically.

In various embodiments, the processes of 822, 824, and 826 may be repeated even after initially granting access to protected data resource 802. For example, a financial broker (e.g., the client) might be accessing and working on a client's account (including protected data resource 802) from an endpoint 808 on a train. While the train, and hence the endpoint 808, remains within the country borders, data sovereignty obligations might be met. However, depending on the data protection rules in that country, if the train, and therefore the endpoint 808, crosses the border, the financial broker might immediately incur a data sovereignty violation, which might be logged and may lead to considerable fines.

To avoid this, the first assessment made by posture service 812 may determine that, the endpoint 808 is moving and/or that it is moving in manner that exceeds a threshold speed and/or is characterized by a vector that indicates that the endpoint 808 will cross a border within a threshold amount of time. That is, the posture data (e.g., geographical location, vector, heading, speed, mobility pattern, etc.) collected by posture service 812 may indicate that while endpoint 808's current location may enable access to protected data resource 802, endpoint 808's future location might not.

Hence, based on an initial and/or earlier posture assessment, posture service 812 and/or observability and assurance engine 406 may proactively repeat the processes of 822, 824, and 826 within a set of computed time windows (e.g., a time window determined based on a geographical location of endpoint 808, vector of endpoint 808, heading of endpoint 808, speed of endpoint 808, mobility pattern of endpoint 808, etc.) to reassess endpoint 808's posture. Indeed, posture service 812 may run analytics and dynamically query a set of endpoints 808 based on their current location and mobility patterns. In such scenarios, observability and assurance engine 406 may be proactively notified and reconfigure the respective local observability and assurance services 510 to block access to the corresponding protected data resource 802.

In some examples, such an access block may be triggered responsive to endpoint 808 demonstrating that it is at all mobile and/or the mobility pattern is exceeding a threshold amount of mobility. In some examples, the access block may be a temporary access block that is removed once endpoint 808's mobility pattern changes and/or has been reassessed by a subsequent repeat of the processes of 822, 824, and 826 and is determined to comply with the relevant data handling constraints.

Observability and assurance engine 406, posture service 812 and/or a set of local observability and assurance services 510 running locally in each cluster 508 may cooperatively provide dynamic resolution and enforcement of data sovereignty and other data compliance rules dynamically at run time with external and/or mobile endpoints. In various embodiments, these elements may work in concert and leverage the elements of the DCaC model, such as annotated application code and resulting data to provide these functionalities.

Figure 9:
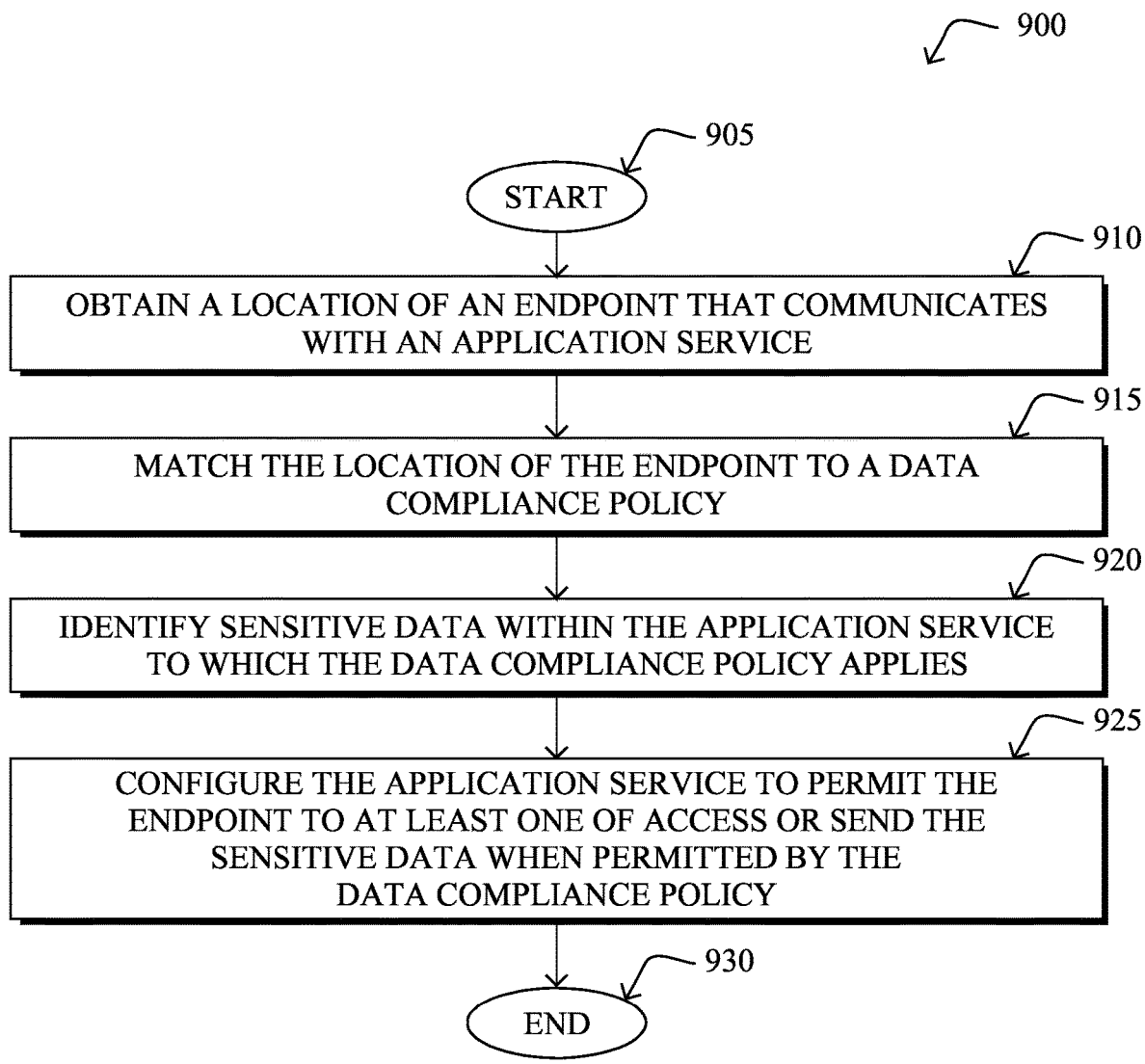
FIG. 9 illustrates an example simplified procedure for dynamic resolution and enforcement of data compliance with endpoints.

FIG. 9 illustrates an example simplified procedure (e.g., a method) for dynamic resolution and enforcement of data compliance with endpoints, in accordance with one or more embodiments described herein. For example, a non-generic, specifically configured device (e.g., device 200), may perform procedure 900 by executing stored instructions (e.g., data compliance resolution and enforcement process 248). The procedure 900 may start at step 905, and continues to step 910, where, as described in greater detail above, a device may obtain a location of an endpoint that communicates with an application service. The application service may be hosted in at least one of the cloud, the edge, or in a private infrastructure. For example, the application service may be cloud-hosted, edge-hosted, private-infrastructure-hosted, such as at private data centers, as well as hosted in hybrid environments. For example, an application service may include a set of services running across public/private clouds, edge, and private data centers (e.g., the application service may have some of its services running on premises). Obtaining the location may include sending a challenge query to the endpoint for its location. In various embodiments, the endpoint may be queried for its location according to a schedule as based on movement of the endpoint. For example, a querying schedule may be computed for determining the endpoint's geographical location within specific time windows determined from data indicative of the movement of the endpoint.

At step 915, as detailed above, a device may match the location of the endpoint to a data compliance policy.

At step 920, the device may identify sensitive data within the application service to which the data compliance policy applies, as described in greater detail above.

At step 925, where, as detailed above, the device may configure the application service to permit the endpoint to at least one of access or send the sensitive data when permitted by the data compliance policy. The endpoint may be authorized to access non-sensitive data via the application regardless of its location. That is, the endpoint may be permitted to access non-sensitive data via the application without additional permission and/or without performing the above-described process for accessing sensitive data.

The sensitive and non-sensitive data may be discerned between based on annotations embedded in the program code of the application. For example, the sensitive data may be flagged via annotations embedded into program code of the application. In addition, the data compliance policy may be generated based on the annotations embedded into program code of the application.

Configuring the application to permit the endpoint to access the sensitive data when permitted by the data compliance policy may include sending token information to the application for a token issued to the endpoint that is associated with the location. The token may be used by the endpoint to access the sensitive data.

In various embodiments, the application may be reconfigured to prevent the endpoint from accessing the sensitive data based on a new location (e.g., a location that violates and/or is likely to violate a data compliance policy) of the endpoint. In such examples, reconfiguring may include pushing a filter to a sidecar proxy of the application. The application may be executed in a distributed data mesh across multi-cloud and edge environments. The filter may be utilized within the data mesh to prevent the endpoint from at least one of accessing or sending the sensitive data.

Procedure 900 then ends at step 930.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, may be utilized to provide dynamic resolution and enforcement of data compliance with endpoints. For example, these techniques introduce using a posture service to transmit trusted posture information to an observability and assurance engine, which may include location coordinates and/or the potential use of a VPN. The observability and assurance engine may process this posture information and dynamically resolve the compliance constraints for a specific data transaction, which may include state, province, country, and multi-country specific constraints, industry-specific constraints, and organization-specific constraints. This may provide posture service with trusted posture information including compliance-specific posture computations and dynamically resolved compliance constraints.

In addition, these techniques provide for an automated configuration of a set of compliance constraints to a group of local observability and assurance services running inside a set of clusters, based on the dynamic resolution of compliance posture. This provides for the automated enforcement of a set of data compliance constraints based on the dynamic resolution of compliance posture conducted by the observability and assurance engine.

As such, these techniques provide for dynamic assessment of the posture and metadata received from an endpoint. This provides an automated mechanism to dynamically authorize or deny access to a data resource based on the protected types and bindings defined and/or based on based on changes in the posture and/or metadata received from the endpoints. In addition, the functionality may be utilized to dynamically authorize or deny the reallocation of workloads and data exchanges based on posture and/or metadata received.

Accordingly, techniques herein allow for dynamic resolution and enforcement of data sovereignty and other data compliance rules for online applications at run time. These techniques provide automatic adaptation to different geographical locations and amalgamate various rules, including state, province, country, and multi-country specific obligations, industry-specific regulation, as well as rules specifically defined by an organization. The techniques described herein cover applications deployed across heterogeneous multi-cloud and edge infrastructures and are applicable when the endpoints that may consume and/or process the application data might not only be located outside the service clusters but also on the move.

While there have been shown and described illustrative embodiments that provide dynamic resolution and enforcement of data compliance with endpoints, it is to be understood that various other adaptations and modifications may be made within the spirit and scope of the embodiments herein. For example, while certain embodiments are described herein with respect to using the techniques herein for certain purposes, the techniques herein may be applicable to any number of other use cases, as well.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:
1. A method comprising:
obtaining, by a device, a location of an endpoint that communicates with an application service, wherein the location of the endpoint is indicative of at least a geographical location of the endpoint;

matching, by the device, the location of the endpoint to a data compliance policy;

identifying, by the device, sensitive data within the application service to which the data compliance policy applies; and configuring, by the device, the application service to permit the endpoint to at least one of access or send the sensitive data when permitted by the data compliance policy.

2. The method as in claim 1, wherein the endpoint is authorized to at least one of access or send non-sensitive data via the application service regardless of its location.

3. The method as in claim 1, wherein the sensitive data is flagged via annotations embedded into program code of the application service.

4. The method as in claim 3, further comprising:
generating the data compliance policy based on the annotations embedded into program code of the application service.

5. The method as in claim 1, wherein configuring the application service to permit the endpoint to at least one of access or send the sensitive data when permitted by the data compliance policy comprises:
sending token information to the application service for a token issued to the endpoint that is associated with the location.

6. The method as in claim 1, further comprising:
querying the endpoint for its location according to a schedule as based on movement of the endpoint.

7. The method as in claim 1, further comprising:
reconfiguring, by the device, the application service to prevent the endpoint from at least one of accessing or sending the sensitive data based on a new location of the endpoint.

8. The method as in claim 1, wherein the application service is hosted in at least one of a cloud, an edge, or a private infrastructure.

9. The method as in claim 1, wherein obtaining the location of the endpoint that accesses the application service comprises:
sending a challenge query to the endpoint for its location.

10. The method as in claim 1, wherein the application service is executed in a data mesh.

11. An apparatus, comprising:
one or more network interfaces;
a processor coupled to the one or more network interfaces and configured to execute one or more processes; and
a memory configured to store a process that is executable by the processor, the process when executed configured to:
obtain a location of an endpoint that communicates with an application service, wherein the location of the endpoint is indicative of at least a geographical location of the endpoint;
match the location of the endpoint to a data compliance policy;
identify sensitive data within the application service to which the data compliance policy applies; and
configure the application service to permit the endpoint to at least one of access or send the sensitive data when permitted by the data compliance policy.

12. The apparatus as in claim 11, wherein the endpoint is authorized to at least one of access or send non-sensitive data via the application service regardless of its location.

13. The apparatus as in claim 11, wherein the sensitive data is flagged via annotations embedded into program code of the application service.

14. The apparatus as in claim 13, wherein the process when executed is further configured to:
generate the data compliance policy based on the annotations embedded into program code of the application service.

15. The apparatus as in claim 11, wherein the application service is configured to permit the endpoint to at least one of access or send the sensitive data when permitted by the data compliance policy by sending token information to the application service for a token issued to the endpoint that is associated with the location.

16. The apparatus as in claim 11, wherein the process when executed is further configured to:
query the endpoint for its location according to a schedule as based on movement of the endpoint.

17. The apparatus as in claim 11, wherein the process when executed is further configured to:
reconfigure the application service to prevent the endpoint from at least one of accessing or sending the sensitive data based on a new location of the endpoint.

18. The apparatus as in claim 11, wherein the application service is hosted in at least one of a cloud, an edge, or a private infrastructure.

19. The apparatus as in claim 11, wherein obtaining the location of the endpoint that accesses the application service comprises:
sending a challenge query to the endpoint for its location.

20. A tangible, non-transitory, computer-readable medium storing program instructions that cause a device to execute a process comprising:
obtaining, by the device, a location of an endpoint that communicates with an application service, wherein the location of the endpoint is indicative of at least a geographical location of the endpoint;
matching, by the device, the location of the endpoint to a data compliance policy;
identifying, by the device, sensitive data within the application service to which the data compliance policy applies; and
configuring, by the device, the application service to permit the endpoint to at least one of access or send the sensitive data when permitted by the data compliance policy.

* * * * *